US011149144B2

(12) United States Patent
LaPray et al.

(10) Patent No.: US 11,149,144 B2
(45) Date of Patent: *Oct. 19, 2021

(54) MARINE BIODEGRADABLE PLASTICS COMPRISING A BLEND OF POLYESTER AND A CARBOHYDRATE-BASED POLYMERIC MATERIAL

(71) Applicant: BiologiQ, Inc., Idaho Falls, ID (US)

(72) Inventors: Bradford LaPray, Idaho Falls, ID (US); Donald R. Allen, Idaho Fails, ID (US); Shigenobu Miura, Tokyo (JP)

(73) Assignee: BIOLOGIQ, INC., Idaho Falls, ID (US)

( * ) Notice: Subject to any disclaimer, the term of this patent is extended or adjusted under 35 U.S.C. 154(b) by 155 days.

This patent is subject to a terminal disclaimer.

(21) Appl. No.: 16/425,397

(22) Filed: May 29, 2019

(65) Prior Publication Data

US 2019/0276664 A1     Sep. 12, 2019

Related U.S. Application Data

(63) Continuation-in-part of application No. 15/691,588, filed on Aug. 30, 2017, which is a continuation-in-part of application No. 14/853,725, filed on Sep. 14, 2015, now abandoned, and a continuation-in-part of application No. 14/853,780, filed on Sep. 14, 2015, now abandoned, and a continuation-in-part of application No. 15/481,806, filed on Apr. 7, 2017, and a continuation-in-part of application No. 15/481,823, filed on Apr. 7, 2017.

(60) Provisional application No. 62/677,368, filed on May 29, 2018, provisional application No. 62/187,231, filed on Jun. 30, 2015, provisional application No. 62/440,399, filed on Dec. 29, 2016, provisional application No. 62/442,432, filed on Jan. 4, 2017.

(51) Int. Cl.
*C08L 67/04* (2006.01)
*C08L 67/02* (2006.01)
*C08L 3/02* (2006.01)

(52) U.S. Cl.
CPC ............. *C08L 67/04* (2013.01); *C08L 3/02* (2013.01); *C08L 67/02* (2013.01); *C08L 2201/06* (2013.01)

(58) Field of Classification Search
CPC ............ C08L 67/02; C08L 67/04; C08L 3/02
See application file for complete search history.

(56) References Cited

U.S. PATENT DOCUMENTS

| | | |
|---|---|---|
| 3,270,874 A | 9/1966 | Hilton |
| 3,865,603 A | 2/1975 | Szymanski |
| 4,016,117 A | 4/1977 | Griffin |
| 5,026,745 A | 6/1991 | Weil |
| 5,095,054 A | 3/1992 | Lay et al. |
| 5,314,934 A | 5/1994 | Tomka |
| 5,449,708 A | 9/1995 | Schiltz |
| 5,462,983 A | 10/1995 | Bloembergen |
| 5,510,401 A | 4/1996 | Dehennau et al. |
| 5,714,445 A | 2/1998 | Trinh |
| 6,211,325 B1 | 4/2001 | Sun |
| 6,472,497 B2 | 10/2002 | Loercks et al. |
| 6,605,657 B1 | 8/2003 | Favis et al. |
| 6,783,854 B2 | 8/2004 | Bond |
| 6,818,295 B2 | 11/2004 | Bond et al. |
| 6,841,597 B2 | 1/2005 | Bastioli et al. |
| 6,844,380 B2 | 1/2005 | Favis et al. |
| 6,946,506 B2 | 9/2005 | Bond et al. |
| 7,608,649 B2 | 10/2009 | Sun |
| 7,666,261 B2 | 2/2010 | Bailey et al. |
| 7,740,952 B2 | 6/2010 | Hausmann |
| 7,998,888 B2 | 8/2011 | Shi |
| 8,188,185 B2 | 5/2012 | Wang |

(Continued)

FOREIGN PATENT DOCUMENTS

| | | |
|---|---|---|
| CA | 1031088 | 5/1978 |
| CN | 1312838 A | 9/2001 |

(Continued)

OTHER PUBLICATIONS

Machine translation of JP-2008013602-A (Year: 2008).*
"Environmentally Degradable Plastics," Leonardo Da Vinci Program, Contract Nol 1/98/2/05261/PI/11.1.1.b/CONT, 202 pages. May 4, 1999.
"Biodegradation of starch-polyethylene films in soil and by microbial cultures", Nov. 1997, Dave, et al. World Journal of Microbiology and Technology, 13, 655-68., World Journal of Microbiology and Technology, 655-668, 13.
Applicant's Transmittal Letter labeled information Disclosure Statement Under 37 CFR 1.97 dated Sep. 26, 2018.

(Continued)

*Primary Examiner* — Wenwen Cai
(74) *Attorney, Agent, or Firm* — Workman Nydegger

(57) ABSTRACT

Composite blends of polyester containing plastic materials, and a starch-based polymeric material that increases the biodegradability of the polyesters of such a composite in simulated or actual marine conditions (e.g., simulated by ASTM D-6691). Enhanced rate or extent of biodegradation may also be exhibited in simulated or actual land-based disposal conditions. The starch-based polymeric materials are substantially amorphous, and are homogenously blended with the polyester plastic materials. While polyester plastics such as PBAT, PLA, PCL, and/or PBS may exhibit some biodegradability characteristics when composted and/or disposed of in landfill conditions at elevated temperatures, they exhibit limited if any biodegradability when disposed of in a marine environment. Even conventional blends of starch with such polyesters do not exhibit any significant marine biodegradability with respect to the polyester components therein. Third party testing shows the present blends exhibit substantially complete biodegradability of the entire composite under marine conditions, after about 400 days.

20 Claims, 6 Drawing Sheets

(56) References Cited

U.S. PATENT DOCUMENTS

| | | | |
|---|---|---|---|
| 8,232,348 B2 | 7/2012 | Changping | |
| 8,283,006 B2 | 10/2012 | Wang | |
| 8,329,501 B1 | 12/2012 | Robinson et al. | |
| 8,329,601 B2 | 12/2012 | Shi | |
| 8,466,337 B2 | 6/2013 | Wang | |
| 8,802,754 B2 | 8/2014 | Nie | |
| 8,807,254 B2 | 8/2014 | Manus | |
| 8,889,945 B2 | 11/2014 | Wang | |
| 8,927,611 B2 | 1/2015 | Voolapalli et al. | |
| 8,927,617 B2 | 1/2015 | Funk | |
| 8,969,224 B2 | 3/2015 | Masuda et al. | |
| 9,056,968 B2 | 6/2015 | Matsuo et al. | |
| 9,273,207 B2 | 3/2016 | Bastioli | |
| 9,327,438 B2 | 5/2016 | Wang | |
| 9,464,188 B2 | 10/2016 | Wang | |
| 9,884,471 B2 | 2/2018 | Neuman et al. | |
| 10,131,783 B2 | 11/2018 | Schmidt et al. | |
| 10,214,634 B2 | 2/2019 | LaPray | |
| 10,239,292 B2 | 3/2019 | Nissenbaum et al. | |
| 10,752,759 B2 | 8/2020 | Lapray et al. | |
| 2002/0006989 A1 | 1/2002 | Bastioli | |
| 2002/0168517 A1 | 11/2002 | Husemann et al. | |
| 2002/0168518 A1 | 11/2002 | Bond et al. | |
| 2002/0188041 A1 | 12/2002 | Bond et al. | |
| 2003/0077444 A1 | 4/2003 | Bond et al. | |
| 2003/0166779 A1 | 9/2003 | Khemani | |
| 2007/0129468 A1* | 6/2007 | Bastioli | C08L 101/00 524/47 |
| 2008/0103232 A1 | 5/2008 | Lake | |
| 2008/0287592 A1 | 11/2008 | Favis | |
| 2009/0048368 A1 | 2/2009 | Bash | |
| 2010/0159777 A1 | 6/2010 | Wang | |
| 2010/0311874 A1 | 12/2010 | Mentink | |
| 2011/0287929 A1 | 11/2011 | Smith | |
| 2012/0059097 A1 | 3/2012 | Liao | |
| 2012/0139154 A1 | 6/2012 | Huneault | |
| 2012/0283364 A1 | 11/2012 | Sarazin et al. | |
| 2012/0316257 A1 | 12/2012 | Bastioli | |
| 2013/0001289 A1 | 1/2013 | Tedford | |
| 2013/0157031 A1 | 6/2013 | Wang | |
| 2013/0157032 A1 | 6/2013 | Wang | |
| 2014/0011921 A1 | 1/2014 | Bash | |
| 2014/0079935 A1 | 3/2014 | Broyles | |
| 2014/0272370 A1 | 9/2014 | Broyles | |
| 2016/0107426 A1 | 4/2016 | Leufgens | |
| 2017/0002184 A1 | 1/2017 | Lapray et al. | |
| 2017/0002185 A1 | 1/2017 | Lapray et al. | |
| 2017/0210889 A1 | 7/2017 | LaPray | |
| 2017/0218184 A1 | 8/2017 | LaPray | |
| 2017/0283597 A1 | 10/2017 | LaPray et al. | |
| 2017/0362418 A1 | 12/2017 | LaPray | |
| 2018/0100060 A1 | 4/2018 | LaPray | |
| 2019/0194426 A1 | 2/2019 | LaPray | |
| 2019/0256681 A1 | 8/2019 | LaPray | |
| 2019/0315942 A1 | 10/2019 | LaPray | |
| 2019/0315947 A1 | 10/2019 | LaPray | |
| 2020/0339781 A1 | 10/2020 | Lapray et al. | |
| 2020/0339784 A1 | 10/2020 | Lapray et al. | |
| 2020/0339803 A1 | 10/2020 | Allen et al. | |
| 2020/0377705 A1 | 12/2020 | LaPray et al. | |

FOREIGN PATENT DOCUMENTS

| | | | |
|---|---|---|---|
| CN | 1603361 | | 4/2005 |
| CN | 101589097 | | 11/2009 |
| CN | 101932647 | A | 12/2010 |
| CN | 102066467 | A | 5/2011 |
| CN | 102153786 | A | 8/2011 |
| CN | 102329436 | A | 1/2012 |
| CN | 101805499 | B | 5/2012 |
| CN | 102639594 | A | 8/2012 |
| CN | 102850626 | | 1/2013 |
| CN | 103289165 | | 9/2013 |
| CN | 103819794 | A | 5/2014 |
| CN | 103987504 | | 8/2014 |
| CN | 103998195 | | 8/2014 |
| CN | 105531115 | A | 4/2016 |
| CN | 105966014 | | 9/2016 |
| CN | 103627153 | | 2/2018 |
| CN | 103627153 | B | 2/2018 |
| CN | 107793619 | A | 3/2018 |
| CN | 105670239 | B | 6/2018 |
| CN | 108276744 | | 7/2018 |
| EP | 0497706 | A1 | 8/1992 |
| EP | 326517 | | 7/1994 |
| EP | 1930487 | A1 | 6/2008 |
| EP | 2762307 | | 8/2014 |
| GB | 2272699 | | 5/1994 |
| JP | S49055740 | | 5/1974 |
| JP | S50086543 | | 7/1975 |
| JP | H07126449 | | 5/1995 |
| JP | H07258488 | | 10/1995 |
| JP | H09041224 | | 2/1997 |
| JP | 10-259083 | A | 9/1998 |
| JP | H11322962 | | 11/1999 |
| JP | 2003518541 | | 6/2003 |
| JP | 3539955 | | 7/2004 |
| JP | 2005089718 | | 4/2005 |
| JP | 2005264111 | | 9/2005 |
| JP | 2008013602 | A * | 1/2008 ............... C08J 5/18 |
| JP | 2010150305 | | 7/2010 |
| JP | 2010260923 | | 11/2010 |
| JP | 2011042032 | | 3/2011 |
| JP | 2011511121 | | 4/2011 |
| JP | 2011213836 | | 10/2011 |
| JP | 2012148507 | | 8/2012 |
| JP | 5544303 | | 7/2014 |
| JP | 2018502744 | | 2/2018 |
| JP | 2018525467 | | 9/2018 |
| TW | 201538529 | | 10/2015 |
| WO | 148078 | | 7/2001 |
| WO | 2003014164 | | 11/2004 |
| WO | 2006116861 | | 11/2006 |
| WO | 2007027163 | | 3/2007 |
| WO | 2009073197 | | 6/2009 |
| WO | 2009103052 | | 8/2009 |
| WO | 2011020170 | | 2/2011 |
| WO | 2012088585 | | 7/2012 |
| WO | 2013116945 | | 8/2013 |
| WO | 2014089321 | | 6/2014 |
| WO | 2014/190935 | A1 | 12/2014 |
| WO | 2014190395 | | 12/2014 |
| WO | 2015028943 | | 3/2015 |
| WO | 2016109196 | | 7/2016 |
| WO | 2016/134994 | A1 | 9/2016 |
| WO | 2018/125897 | A1 | 7/2018 |
| WO | 2018187784 | | 10/2018 |

OTHER PUBLICATIONS

Arvanitoyannis et al., Biodegradable films made from low density polyethylene (LDPE), rice starch and potato starch for food packaging applications: Part 1, Carbohydrate Polymers, vol. 36, (1998), pp. 89-104.

Biodegradable Plastics Standard to Bust Landfill Waste, ENSO Plastic Blog, printed Feb. 20, 2019, 3 pages.

Campo, E. Alfredo, Polymeric Materials and Properties, Science Direct, 2018.

Cardia Biohybrid, Film Blowing/ Blow Moulding Resin, Sep. 8, 2017.

Cardia Bioplastics FAQ [online] [site accessed Oct. 23, 2020 18] URL: http://www.cardiabioplastics.com/our-business/fag.

Cardia Compostable B-F, Blown Film Resin, Biodegradable during Composting in Professionally Managed Facilities, CBP Technical Data Sheet, 110317, 2 pages. 2019.

Chen et al., "Environmental Degradation of Starch/Poly(Lactic Acid) Composite in Seawater," Key and Open Laboratory of Marine and Estuarine Fisheries Ministry of Agriculture, East China Sea Fisheries Research Institute, Chinese Academy of Fishery Sciences, Polymers and Polymer Composites, vol. 19, No. 7, 2011, pp. 559-566.

(56) References Cited

OTHER PUBLICATIONS

Corn Starch/Fisher Scientific, 3 pages [online] [site accessed Sep. 18, 2020] url: https://www.fishersci.com/shop/products/corn-starch-2/S25580 (undated).
Droge et al, WO 2016/134994 Machine Translation, Sep. 1, 2016 (Year: 2016).
English Abstract of BY 21006 C1. Apr. 2017.
Final Office Action received for U.S. Appl. No. 15/836,555, dated Nov. 30, 2020, 27 pages.
Gadhave et al., Starch Based Bio-Plastics: The Future of Sustainable Packaging, Open Journal of Polymer Chemistry, 2018, vol. 8, pp. 21-33.
Gilfillan, "Developing Starch-Based Polymer Composites", Doctor of Philosophy, 2015, pp. 1-128.
Huagong et al., "Green Manufacturing Process of Fine Chemical Industry", 2006, Guangdong Science & Technology Press (National Outstanding Press).
International Search Report issued in PCT Application PCT/US2019/28733, dated Mar. 9, 2019.
Meereboer et al., "Review of recent advances in the biodegradability of polyhydroxyalkanoate (PHA) bioplastics and their composites," Green Chem., vol. 22, 2020, pp. 5519-5558.
Ming et al, CN107793619 Machine Translation, Mar. 13, 2018 (Year: 2018).
Nayak, "Biodegradable PBAT/Starch Nanocomposites", Nov. 24, 2010, Polymer-Plastics Technology and Engineering, 49:14, pp. 1406-1418, accessed on Feb. 24, 2013.
Nguyen et al., "Biodegradability of polymer film based on low density polyethylene and cassava starch," International Biodeterioration & Biodegradation, vol. 115, 2016, pp. 257-265.
Non-Final Office Action received for U.S. Appl. No. 15/691,588, dated Sep. 24, 2020, 10 pages.
Notice of Allowance received for U.S. Appl. No. 16/456,303, dated Jul. 1, 2020.
Notice of Allowance received for U.S. Appl. No. 16/456,303, dated Jul. 28, 2020.
Office action for U.S. Appl. No. 14/853,725, dated Apr. 30, 2018, LaPray et al., "Articles Formed with Biodegradable Materials and Strength Characteristics of Same", 19 pages.
Office Action received for U.S. Appl. No. 16/391,909 , dated Dec. 1, 2020.
Ojeda, et al., "Degradability of linear polyolefins under natural weathering, Polymer Degradation and Stability," 2011, pp. 703-707.
Requirement for Restriction/Election received for U.S. Appl. No. 16/391,909, dated Sep. 8, 2020.
Sashiwa et al., "Microbial Degradation Behavior in Seawater of Polyester Blends Containing Poly(3-hydroxybutyrate-co-3-hydroxyhexanoate) (PHBHHx),"Mar. Drugs, vol. 16, 2018, 34, 11 pages.
Schwach et al., "Starch-based biodegradable blends: morphology and interface properties", 2004, Polymer International, vol. 53, pp. 2115-2124, DOI: 10.1002/pi.1636.
Shahin, "In-situ Nano Fibrillation of Polyethylene Terephthalate (PET) in Polypropylene (PP) through Spunbond Process,"Department of Mechanical and Industrial Engineering, 2019, 89 pages.
U.S. Appl. No. 15/481,823, filed Apr. 7, 2017, LaPray.
U.S. Application filed Apr. 7, 2017, by LaPray, U.S. Appl. No. 15/481,806.
U.S. Application filed Apr. 23, 2019, by LaPray, U.S. Appl. No. 16/391,909.
U.S. Application filed Aug. 30, 2017, by LaPray., U.S. Appl. No. 15/691,588.
U.S. Application filed Feb. 27, 2019, by LaPray, U.S. Appl. No. 16/287,884.
U.S. Application filed Jun. 20, 2017, by LaPray, U.S. Appl. No. 15/628,379.
Vargha et al., "Behavior of Polyethylene Films in Soil, Periodica Polytechnica Chemical Engineering," DOI: 10.3311/PPch. 8281, Creative Commons Attribution, 2016, pp. 60-68.
Yu et al., "Morphology and Mechanical Properties of Immiscible Polyethylene/Polyamide12 Blends Prepared by High Shear Processing," Chinese Journal of Polymer Science, 2017, 35(9):1132-1142.
Zhang et al., "Retrogradation and Antiplasticization of Thermoplastic Starch," Richardson Centre for Functional Foods and Nutraceuticals, University of Manitoba, www.intechopen.com, 19 pages. 2012.
Zhong et al., "Biodegradable polymers and green-based antimicrobial packaging materials: A mini-review," Advanced Industrial and Engineering Polymer Research, vol. 3, 2020, pp. 27-35.
PCT Search Report dated Sep. 14, 2016 for PCT/US2016/040092, 1 page.
PCT Search Report dated Sep. 15, 2016 for PCT/US2016/040104, 1 page.
Kalambur, et al., "An Overview of Starch-Based Plastic Blends from Reactive Extrusion" Journal of Plastic Film and Sheeting, 2006, vol. 22, pp. 39-58.
Wootthikanokkhan, et al., "Effect of Blending Conditions on Mechanical, Thermal, and Rheological Properties of Plasticized Poly(lactic acid)/Maleated Thermoplastic Starch Blends," Journal of Applied Polymer Science, 2012, vol. 124, pp. 1012-1019.
Tang, et al., "Recent Advances in Starch, Polyvinyl Alcohol Based Polymer Blends, Nanocomposites and their Biodegradability" Carbohydrate Polymers, 2011, vol. 85, pp. 7-16.
Turley "Coca-Cola Collaborates on Bio-PET Project" ChemistryWorld, Jun. 11, 2012, accessed Apr. 6, 2017 at https://www.chemistryworld.com/news/coca-cola-collaborates-on-bio-pet-project/5091.article, 2 pages.
Braskem "Life Cycle Assessment of Green Plastic" Available as early as Mar. 28, 2017, accessed at http://www.braskem.com_site.aspx_plastic-green, 18 pages.
De Guzman "Coca-Cola produces 100% Bio-Based PET Bottle" Green Chemicals Blog, Jun. 9, 2015, 3 pages, accessed on Mar. 28, 2017 at https://greenchemicalsblog.com/2015/06/09/coca-cola-produces-100-bio-based-pet-bottle/ 3 pages.
Ojeda, Telmo, et al., "Polymer Degradation and Stability" Available as early as Dec. 16, 2010 at www.elsevier.com/locat/polydegstab, 5 pages.
Thakore, I.M., et al., "Studies on Biodegradability, morphology and thermo-mechanical properties of LDPE/modified starch blends" published in *The European Polymer Journal*, vol. 37 2001, pp. 151-160.
Vargha, et al., "Behavior of Polyethylene Films in Soil" published in Periodica Polytechnica Chemical Engineering, Nov. 5, 2015 pp. 60-68.
Li, Gang, et al., "Biodegradation of Thermoplastic Starch and its Blends with Poly(lactic acid) and Polyethylene: Influence of Morphology" published in Macromolecular Journals of Chemistry and Physics, 2011 pp. 1147-1154.
Ibbrucker, Constance "Can Additives make plastics biodegradable?" Bioplastics Magazine Jan. 2017, 1 page.
Ibbrucker, Constance "Oxo-degradable plastics increasingly under fire in Europe" European Bioplastics, http://www.european-bioplastics.org/oxo-degradable-plastics-increasingly-under-fire-in-europe/ Feb. 28, 2017, 5 pages.
"'Oxo-Biodegradable' Plastics and Other Plastics with Additives for Degradation" European Bioplastics BackGround Oct. 2015, 5 pages.
"BPI Position on Degradable Additives" Feb. 2010, 6 pages.
"The SPC Position Against Biodegradability Additives for Petroleum-Based Plastics" Sustainable Packaging Coalition, http://www.sustainablepackaging.org/content/?type=5&id=position-against-biodegradability-additives-for-petroleum-based-plastics Retreived on Sep. 19, 2017, 5 pages.
"APR Position Statement—Degradable Additives Use in Bottles, Forms and Films" The Association of Postconsumer Plastic Recyclers, http://plasticsrecycling.org/about/position-statements, Apr. 27, 2015, 1 page.
"Compostable Plastics 101: An Overview of Compostable Plastics Sponsored by the California Organics Recycling Council" based on information and belief, available at least as early as 2012, 23 pages.
Yoshida, et al., "A Bacterium that Degrades and Assimilates Poly(ehylene terphthalate)" Science Magazine vol. 351 Issue 6278 Mar. 11, 2016 pp. 1196-1199.

(56) References Cited

OTHER PUBLICATIONS

"Discover Polysaccharides" Available at http://polysac3db.cermav.cnrs.fr/discover_starch.html; Accessed Feb. 16, 2017, 10 pages.
Tokiwa, et al., "Biodegradability of Plastics" in the International Journal of Molecular Sciences, Aug. 26, 2009, vol. 10, pp. 3722-3742.
International Search Report and Written Opinion for PCT PCT/US2017/068492 dated Mar. 16, 2018, 14 pages.
"Environmentally Degradable Plastics" Leonardo Da Vinci Program; Jan. 2000-Dec. 2006.
Arevalo-Nino et al., "Starch-based extruded plastic films and evaluation of their biodegradable properties" Biodegradation 7: 231-237, 1996.
Chen et al. "Environmental Degradation of Starch/Poly (Lactic Acid) Composite in Seawater" Apr. 6, 2010.
Shogren et al. "Biodegradation of starch/polylactic acid/poly(hydroxyester-ether) composite bars in soil" Polymer Degradation and Stability 79 (2003) 405-411.
"Transition Metal Salts." Oxo-biodegradable Plastics Association, http://www.biodeg.org/index.html. Accessed Apr. 20, 2018.
Luo, Ying, et al. "Accelerating the degradation of polyethylene composite mulches." Plastics Research Online, May 19, 2017. Society of Plastics Engineers (SPE), DOI: 10.2417/spepro.006909. Accessed Apr. 20, 2018.
Shang, Jing, et al. "Photocatalytic Degradation of Polystyrene Plastic under Fluorescent Light." Environmental Science & Technology, Sep. 5, 2003, 37 (19), pp. 4494-4499. American Chemical Society, DOI: 10.1021/es0209464. Accessed Apr. 20, 2018.
Gupta, Apeksha et al. "Visible Range Photocatalysts for Solid Phase Photocatalytic Degradation of Polyethylene and Polyvinyl Chloride." Journal of the Chilean Chemical Society, [S.I.], v. 62, n. 1, Jun. 2017. ISSN 0717-9707. <https://jcchems.com/index.php/JCCHEMS/article/view/156>. Accessed: Apr. 20, 2018.
Oluz, Zehra and Teoman Tinçer. "Additives for ultraviolet-induced oxidative degradation of low-density polyethylene." J. Appl. Polym. Sci., 133, 43354, Jan. 18, 2016. Wiley Online Library, DOI: 10.1002/app.43354. Accessed Apr. 21, 2018.
Thryft, Ann R. "Biodegradable Plastics Standard to Bust Landfill Waste." ENSO Plastics, Nov. 15, 2011. http://ensoplastics.com/theblog/?p=535. Accessed Apr. 23, 2018.
Esmaeili, Atefeh, et al. "Biodegradation of Low-Density Polyethylene (LDPE) by Mixed Culture of Lysinbacillus xylanilyticus and Aspergillus niger in Soil." PLoS One 8(9): e71720, Sep. 23, 2013. https://doi.org/10.1371/journal.pone.0071720. Accessed Apr. 16, 2016.
Sumathi, Tirupati et al. "Production of Laccase by *Cochliobolus* sp. Isolated from Plastic Dumped Soils and Their Ability to Degrade Low Molecular Weight PVC." Biochemistry Research International 2016 (2016): 9519527. PMC. Web. Apr. 16, 2018.
Zhang, et al. "Retrogradation and Antiplasticization of Thermoplastic Starch" Mar. 2012.
Cardia Bioplastics FAQ [online] [site accessed Oct. 23, 2018] URL: http://www.cardiabioplastics.com/our-business/faq.
Fujisawa, et al. "Degradation of Polyethylene and Nylon 66 by the Laccase-Mediator System" Journal of Polymers and the Environment, vol. 9, Issue 3, 2001, pp. 103-108.
Eyheraguibel, et al. "Characterization of oxidized oligomers from polyethylene films by mass spectrometry and NMR spectroscopy before and after biodegradation by a Rhodococcus rhodochrous strain" Chemosphere 184, 2017, pp. 366-374.
Ohtake, et al. "The Biodegradability of Polyethylene" Material Life, vol. 6, Issue 3, 1994, pp. 125-133.
PCT International Search Report and Written Opinion for PCT/US2018/026610 dated Jul. 13, 2018.
Bastioli et al. "Starch in Polymers Technology" ACS Symposium Series, Jan. 1, 2012, American Chemical Society/Oxford University Press, XP055490447, vol. 1114, pp. 87-112.
Van Soest et al. "Crystallinity in Starch Plastics: Consequences for Material Properties" Trends in Biotechnology, vol. 15, No. 6, Jun. 1, 1997, pp. 208-213.

Tena-Salcido et al. "Effect of Morphology on the Biodegradation of Thermoplastic Starch in LDPE/TPS Blends" Polymer Bulletin, vol. 60, No. 5, Jan. 30, 2008, pp. 677-688.
Pearce "Biodegradable plastic bags carry more ecological harm than good" The Guardian, Jun. 18, 2009.
FPA "The Flexible Packaging Association Position on Degradable Additives", Jun. 21, 2010.
Oxo-Biodegradable Plastics Association "French Proposal for Law on Biodegradable Plastics", Revised Oct. 31, 2013.
Natur Bag "Case Study: Compostable vs Oxo Degradable", Feb. 19, 2019.
SPI Bioplastics Division "Position Paper on Degradable Additives", issued Feb. 2016.
European Commission, "Report from the Commission to the European Parliament and the Council on the Impact of the Use of Oxo-Degradable Plastic, Including Oxo-Degradable Plastic Carrier Bags, on the Environment" Brussels, Jan. 16, 2018.
MJS Packaging "What Are Oxo-biodegradable Additives", May 8, 2014.
BPI "Background on Biodegradable Additives", Feb. 12, 2010.
Ahmed et al. Biodegradation of plastics: current scenario and future prospects.
Marianne Shirai "Thermoplastic starch/polyester films: Effects of extrusion process and poly(lactic acid) addition," Elsevier, Materials Science and Engineering, 2013, pp. 4112-4117.
Emmanuel Schwach "Starch-based biodegradable blends: morphology and interface properties," Polymer International, 2004, pp. 2115-2124.
Jie Ren "Preparation, characterization and properties of binary and ternary blends with thermoplastic starch, poly (lactic acid) and poly(butylene adipate-co-terephthalate)," Elsevier, Carbohydrate Polymers, 2008, pp. 576-582.
S.K. Nayak "Biodegradable PBAT/Starach Nanocomposites" Polymer-Plastics Technology and Engineering, 2010, pp. 1406-1418.
*Fine Chemical Engineering Green Production Process*, 1$^{st}$ edition, edited by Qihuang Song, Guangdong Science & Technology Press, published on Mar. 31, 2006, p. 174.
U.S. Appl. No. 14/853,725, Apr. 28, 2017, Office Action.
U.S. Appl. No. 14/853,725, Nov. 8, 2017, Final Office Action.
U.S. Appl. No. 14/853,725, Oct. 12, 2018, Office Action.
U.S. Appl. No. 14/853,780, Oct. 12, 2016, Office Action.
U.S. Appl. No. 14/853,780, May 24, 2017, Final Office Action.
U.S. Appl. No. 14/853,780, Nov. 6, 2017, Office Action.
U.S. Appl. No. 14/853,780, Aug. 10, 2018, Office Action.
U.S. Appl. No. 14/853,780, Feb. 28, 2019, Office Action.
U.S. Appl. No. 15/481,806, Apr. 30, 2018, Office Action.
U.S. Appl. No. 15/481,806, Oct. 12, 2018, Office Action.
U.S. Appl. No. 15/481,806, Feb. 28, 2019, Office Action.
U.S. Appl. No. 15/481,806, Nov. 6, 2019, Final Office Action.
U.S. Appl. No. 15/481,823, Apr. 30, 2018, Office Action.
U.S. Appl. No. 15/481,823, Oct. 12, 2018, Office Action.
U.S. Appl. No. 15/481,823, Feb. 28, 2019, Office Action.
U.S. Appl. No. 15/628,379, Apr. 30, 2018, Office Action.
U.S. Appl. No. 15/628,379, Oct. 3, 2018, Notice of Allowance.
U.S. Appl. No. 15/691,588, Apr. 30, 2018, Office Action.
U.S. Appl. No. 15/691,588, Jan. 2, 2019, Office Action.
U.S. Appl. No. 15/691,588, May 10, 2019, Office Action.
U.S. Appl. No. 15/836,555, Aug. 12, 2019, Office Action.
U.S. Appl. No. 15/691,588, Dec. 9, 2019, Final Office Action.
U.S. Appl. No. 15/481,823, Dec. 9, 2019, Office Action.
Santos, R. A. L. et al. "Starch/Poly 9 Butylene Adipate-Co Terephthlalate/Montmorillonite Films Produced by Blow Extrusion".
U.S. Appl. No. 15/481,823, Jul. 12, 2019, Final Office Action.
U.S. Appl. No. 15/836,555, Feb. 7, 2020, Final Office Action.
U.S. Appl. No. 16/456,303, Apr. 9, 2020, Office Action.
Ruchuan et al., "Study on Starch-Polyethylene Film", Journal of Tianjin University, No. 2, 1990, pp. 23-29.
U.S. Appl. No. 16/999,542, filed Aug. 21, 2020, LaPray.
U.S. Appl. No. 16/925,705, filed Jul. 10, 2020, LaPray.
U.S. Appl. No. 16/925,952, filed Jul. 10, 2020, LaPray.
U.S. Appl. No. 16/925,747, filed Jul. 10, 2020, LaPray.
U.S. Appl. No. 15/481,806, Jul. 29, 2020, Office Action.
U.S. Appl. No. 15/481,823, Jul. 20, 2020, Final Office Action.

(56) References Cited

OTHER PUBLICATIONS

U.S. Appl. No. 16/456,295, Jul. 22, 2020, Office Action.
U.S. Appl. No. 16/287,884, Jul. 30, 2020, Office Action.
U.S. Appl. No. 15/836,555, Jul. 14, 2020, Office Action.
IDS Statement filed Aug. 21, 2020 in U.S. Appl. No. 16/999,542.
Non-Final Office Action received for U.S. Appl. No. 16/391,909, dated Dec. 1, 2020, 10 pages.
Notice of Allowance received for U.S. Appl. No. 15/481,806, dated Jan. 7, 2021, 11 pages.
Notice of Allowance received for U.S. Appl. No. 15/481,823, dated Dec. 9, 2020, 9 pages.
Notice of Allowance received for U.S. Appl. No. 15/481,823, dated Jan. 8, 2021, 2 pages.
Notice of Allowance received for U.S. Appl. No. 16/456,295, dated Dec. 15, 2020, 3 pages.
Notice of Allowance received for U.S. Appl. No. 16/456,295, dated Nov. 19, 2020, 11 pages.
Examiner Interview Summary received for U.S. Appl. No. 15/836,555, dated Mar. 29, 2021, 2 pages.
Notice of Allowance received for U.S. Appl. No. 15/691,588, dated Feb. 24, 2021, 11 pages.
Non-Final Office Action received for U.S. Appl. No. 15/836,555, dated Apr. 13, 2021, 12 pages.
Notice of Allowance received for U.S. Appl. No. 15/836,555, dated May 3, 2021, 6 pages.
Notice of Allowance received for U.S. Appl. No. 16/391,909, dated May 4, 2021, 9 pages.

* cited by examiner

MARINE BIODEGRADABLE PLASTICS COMPRISING A BLEND OF POLYESTER AND A CARBOHYDRATE-BASED POLYMERIC MATERIAL

CROSS-REFERENCE TO RELATED APPLICATIONS

This application claims the benefit of U.S. Application No. 62/677,368 filed May 29, 2018. This application is also a continuation in part of U.S. application Ser. No. 15/691,588 (21132.7) filed on Aug. 30, 2017 which is a continuation in part of U.S. application Ser. No. 14/853,725 (21132.8) filed on Sep. 14, 2015 which claims the benefit of U.S. Provisional Patent Application No. 62/187,231 filed on Jun. 30, 2015. U.S. application Ser. No. 15/691,588 (21132.7) is also a continuation in part of U.S. application Ser. No. 14/853,780 (21132.6) filed on Sep. 14, 2015, and a continuation in part of U.S. application Ser. No. 15/481,806 (21132.1) and Ser. No. 15/481,823 (21132.2), both filed on Apr. 7, 2017. U.S. application Ser. No. 15/691,588 (21132.7) also claims the benefit of U.S. Provisional Patent Application No. 62/440,399 (21132.10) filed on Dec. 29, 2016, and U.S. Provisional Patent Application No. 62/442,432 (21132.11) filed on Jan. 4, 2017. The entire contents of each of the foregoing is incorporated by reference herein.

Other applications are also incorporated herein by reference. For example, each of U.S. Application No. 62/483,219 (21132.4); U.S. application Ser. No. 15/836,555 (21132.4.1); U.S. Provisional Patent Application No. 62/483,109, (21132.5); U.S. Application No. 62/610,615 (21132.9); U.S. Application No. 62/610,618 (21132.12); U.S. application Ser. No. 16/391,909 (21132.14.1) and PCT Application No. PCT/US2017/068492 is incorporated by reference in its entirety herein.

BACKGROUND

Traditional petrochemical-based plastics are formulated to be strong, lightweight, and durable. However, these plastics are typically not biodegradable, and as a result, hundreds of millions of tons of plastic sits in landfills or floats in the ocean. In trying to reduce the amount of plastic waste, some articles typically produced using petrochemical-based plastics are being produced using bioplastic materials which are defined as plastic that is made from renewable resources, or that is biodegradable.

Petrochemical-based plastics materials, such as large quantities of polyethylene and polypropylene, as well as numerous other plastics (polyethylene terephalate, polystyrene, ABS, polyvinyl chloride, polycarbonate, nylon, and the like) are typically not readily biodegradable in typical land disposal environments (e.g., in a landfill), or even more so, when discarded in a marine environment. Such is typically the case even for so called "green" plastics of such materials, where a fraction of the plastic may be sourced from renewable or sustainable sources, rather than petro-chemical feedstocks.

There do exist some specialty plastic materials that can exhibit some degree of compostability and/or biodegradability under some disposal conditions. For example, polylactic acid ("PLA") and polybutyrate adipate terephthalate ("PBAT") (also known as poly(butylene adipate-co-terephthalate)) have been shown to exhibit some degree of compostability and/or biodegradability in some land based disposal conditions (e.g., industrial compost, or in a landfill). While such disposal conditions do then allow for some biodegradability of PLA or PBAT under some such land-based disposal conditions, where temperatures may be somewhat elevated, oxygen and/or light may be present, and degrading microbes are present, the results are different in marine conditions. In other words, while PLA and PBAT may exhibit some biodegradability under such land-based disposal conditions (e.g., ASTM D-5511 or ASTM D-5526 which simulate landfill conditions, or ASTM D-5338 which simulates industrial compost conditions), PLA and PBAT do not exhibit any significant biodegradation when disposed of in a marine environment (e.g., as tested under ASTM D-6691).

It would be an improvement in the art to provide a mechanism that would increase biodegradability of a PLA or PBAT or other ester linked plastic material (i.e., polyester plastic materials) in such marine environments, e.g., as determined under ASTM D-6691.

SUMMARY

This disclosure is directed to methods for increasing biodegradability of a composite polyester containing plastic material, e.g., where the polyester component exhibits limited or perhaps no significant biodegradability on its own in a marine environment. Such a method may include providing a polyester containing plastic material, e.g., one in which the monomers and/or oligomers are connected by ester linkages, such as PBAT, PLA, PCL and/or PBS. Such polyester plastic material may exhibit little or no biodegradability when placed (e.g., disposed of) in a marine environment. A particular carbohydrate-based polymeric material is also provided, for blending with the polyester plastic material, forming a composite of the two. The composite exhibits increased marine biodegradability, which is not due simply to the marine biodegradation of the starch, but the homogenous blend of starch-based polymeric material having particular characteristics, blended with the polyester, actually increases the biodegradability of the polyester polymeric material under marine conditions, besides any biodegradability of the starch-based polymeric material itself.

For example, marine conditions are recognized to be less hospitable to biodegradation due to the typically lower temperatures, as well as lower accessibility of oxygen. Other factors may also play a role (e.g., the presence of particular microbes, etc.). In any case, while some polyester materials are known to exhibit at least some tendency to be compostable or biodegradable when in industrial or other compost, or in a landfill, there are many such polyesters that will not biodegrade to any significant extent in marine conditions (e.g., as simulated by ASTM D-6691).

The present disclosure is also directed to such blends themselves, which exhibit increased marine biodegradability. For example, such blends may exhibit increased marine biodegradation of the polyester component of such blend, as a result of such homogenous blending with the particular carbohydrate-based substantially amorphous polymeric materials. Exemplary substantially amorphous carbohydrate-based polymeric materials are available from Applicant, e.g., under the tradename NuPlastiQ.

Applicants have demonstrated, through third-party testing, increased biodegradation of the polyester component of such blends (i.e., not simply biodegradation of the starch-based or other carbohydrate-based component of the blend). In fact, in some embodiments, substantially complete biodegradation may occur in marine conditions after about 400 days, for the presently described composite materials. By substantially complete, it is meant that the marine biodegradation may equal or exceed that achieved by a cellulose positive control, tested under the same conditions, or be greater than 80%, 85%, 90%, or 95% of the relevant material.

Blends of such composite plastics may be processed according to a wide variety of known methods of manufacture for forming extruded plastic products, injection molded plastic products, blow molded plastic products, blown film plastic products, extruded or cast sheet or films, thermoformed plastic products, and the like.

This disclosure is also directed to composite polyester blends containing a polyester-containing plastic material in combination with the carbohydrate-based polymeric materials as described herein, wherein the blend exhibits enhanced (e.g., increased rate or extent) of biodegradation, some particular disposal environment (e.g., whether marine or land-based). For example, while many such polyester materials exhibit biodegradability in a land-based disposal environment (e.g., landfill or compost conditions), the presently disclosed blends can exhibit enhanced biodegradability, in that rate and/or extent of biodegradation is increased as compared to what occurs with the polyester alone, or even where the polyester is blended with starch, or a conventional TPS material. Exemplary polyester containing plastic materials may include any of those otherwise disclosed herein (e.g., PBAT, PLA, PCL and/or PBS).

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

I. Definitions

Figure 1:
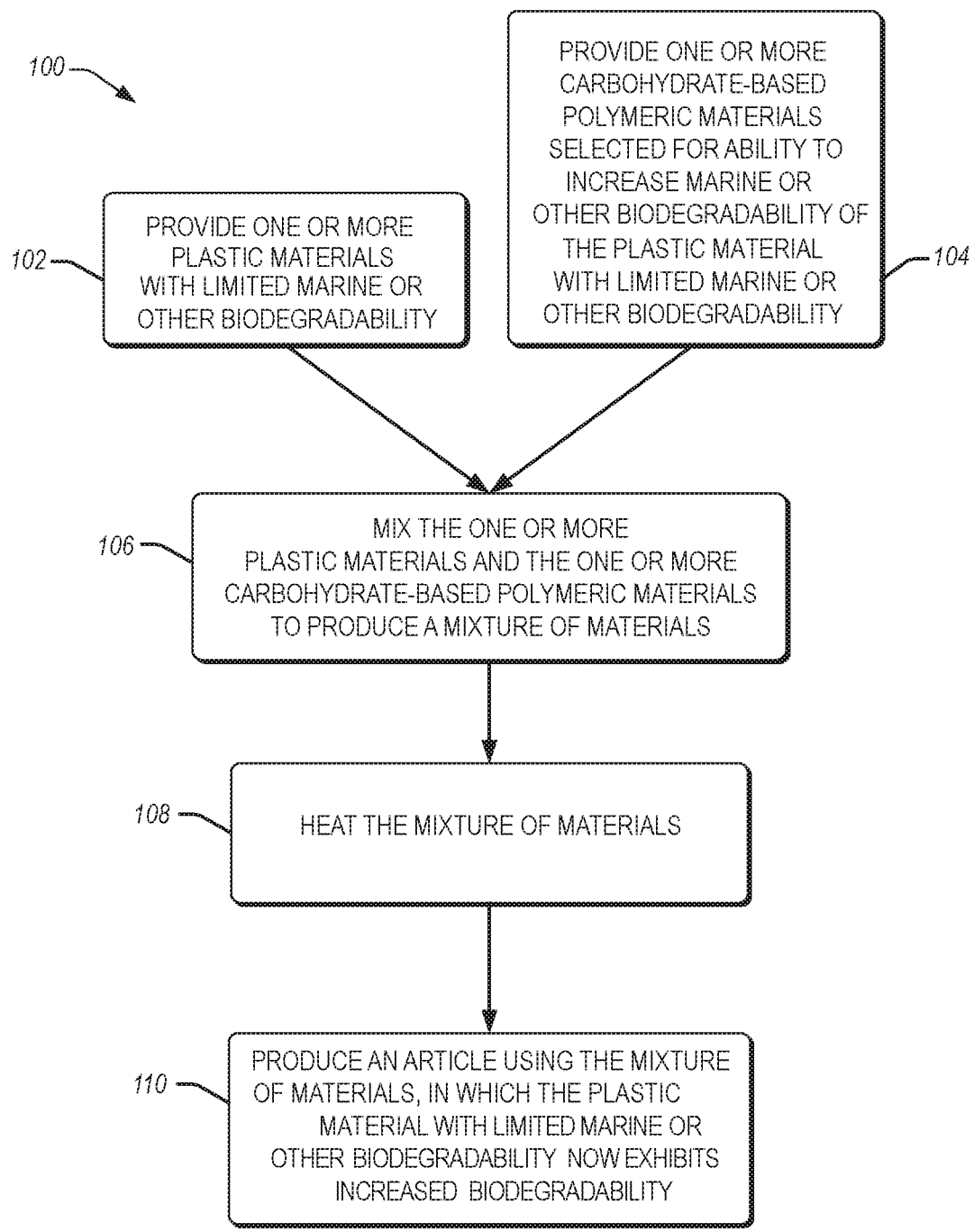
FIG. 1 illustrates a flow diagram of an exemplary process for forming an article so as to increase the marine biodegradability of the polyester component(s) included in the plastic article.

All publications, patents and patent applications cited herein, whether supra or infra, are hereby incorporated by reference in their entirety to the same extent as if each individual publication, patent or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

The terms "a," "an," "the" and similar referents used in the context of describing the inventive features (especially in the context of the following claims) are to be construed to cover both the singular and the plural, unless otherwise indicated herein or clearly contradicted by context. Thus, for example, reference to a "starch" can include one, two or more starches.

"Film," as used herein, refers to a thin continuous article that includes one or more polymeric materials that can be used to separate areas or volumes, to hold items, to act as a barrier, and/or as a printable surface.

"Bag," as used herein, refers to a container made of a relatively thin, flexible film that can be used for containing and/or transporting goods.

"Bottle," as used herein, refers to a container that can be made from the presently disclosed plastics, typically of a thickness greater than a film, and which typically includes a relatively narrow neck adjacent an opening. Such bottles may be used to hold a wide variety of products (e.g., beverages, personal care products such as shampoo, conditioner, lotion, soap, cleaners, and the like).

"Biodegradable", "biodegrade" and the like as used herein, refers to decomposition of the described plastic materials into natural elements or compounds such as carbon dioxide, methane, water, inorganic compounds, or biomass via microbial assimilation. The biodegradability of the present plastic blends can be evaluated through standardized tests (e.g., ASTM D-6691), confirming that such materials are substantially fully converted back into natural components (such as $CO_2$, $CH_4$, and $H_2O$).

"Marine" as used herein, e.g., when referring to the ability of the present plastic blends to biodegrade in a marine environment refers to water environments, whether salt-water (e.g., oceans or seas) or fresh-water (e.g., lakes, rivers, and the like).

Unless otherwise stated, all percentages, ratios, parts, and amounts used and described herein are by weight.

Numbers, percentages, ratios, or other values stated herein may include that value, and also other values that are about or approximately the stated value, as would be appreciated by one of ordinary skill in the art. A stated value should therefore be interpreted broadly enough to encompass values that are at least close enough to the stated value to perform a desired function or achieve a desired result, and/or values that round to the stated value. The stated values include at least the variation to be expected in a typical manufacturing or other process, and may include values that are within 25%, 15%, 10%, within 5%, within 1%, etc. of a stated value. Furthermore, the terms "substantially", "similarly", "about" or "approximately" as used herein represent an amount or state close to the stated amount or state that still performs a desired function or achieves a desired result. For example, the term "substantially" "about" or "approximately" may refer to an amount that is within 25% of, within 15% of, within 10% of, within 5% of, or within 1% of, a stated amount or value.

Some ranges are disclosed herein. Additional ranges may be defined between any values disclosed herein as being exemplary of a particular parameter. All such ranges are contemplated and within the scope of the present disclosure. Further, recitation of ranges of values herein is intended to serve as a shorthand method of referring individually to each separate value falling within the range. Unless otherwise indicated herein, each individual value is incorporated into the specification as if it were individually recited herein.

All numbers expressing quantities of ingredients, constituents, conditions, and so forth used in the specification and claims are to be understood as being modified in all instances by the term "about". Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The phrase 'free of' or similar phrases as used herein means that the composition comprises 0% of the stated component, that is, the component has not been intentionally added to the composition. However, it will be appreciated that such components may incidentally form under appropriate circumstances, may be incidentally present within another included component, e.g., as an incidental contaminant, or the like.

The phrase 'substantially free of' or similar phrases as used herein means that the composition preferably comprises 0% of the stated component, although it will be appreciated that very small concentrations may possibly be present, e.g., through incidental formation, incidental contamination, or even by intentional addition. Such components may be present, if at all, in amounts of less than 1%, less than 0.5%, less than 0.25%, less than 0.1%, less than 0.05%, less than 0.01%, less than 0.005%, or less than 0.001%.

II. Introduction

The present disclosure is directed to, among other things, methods for lending biodegradability to a polyester plastic material in a marine environment, where such polyester plastic material exhibits limited, if any, biodegradability in such marine conditions on its own. Applicant has discovered that while such polyester materials may not be readily biodegradable in a marine environment, that by homogeneously blending the polyester material with particular carbohydrate-based (e.g., starch-based) polymeric materials available from Applicant, that the biodegradability of the polyester material itself can be increased (e.g., in rate and/or extent). Third party test results show substantially complete biodegradation of the entire blended polymeric material (i.e., both the polyester and the carbohydrate-based polymeric material) when subjected to conditions simulating marine disposal (e.g., ASTM D-6691) after approximately 400 days. Such methods and blends are particularly beneficial in that they provide a viable alternative for manufacture of numerous plastic items that may eventually be disposed of in the ocean or another marine environment (e.g., freshwater lake or river), allowing such materials to advantageously biodegrade under such conditions within a reasonable time-frame, rather than existing in their plastic stable state indefinitely. While marine disposal is certainly undesirable, the reality is that many plastic items eventually find their way into such environments. The present embodiments will allow such materials to biodegrade in such conditions.

Furthermore, Applicant has observed that biodegradation of such articles does not readily occur where the articles are stored in typical storage and use environments (e.g., stored in a home, office, warehouse, or the like), but that biodegradation generally only begins to occur where the article is placed in an environment that simulates or is that of typical disposal conditions (e.g., landfill, compost, or marine disposal). For example, such conditions often include (i) a temperature that maybe at least somewhat elevated above normal ambient "use" or "storage" temperatures, (ii) exposure to elevated moisture levels, and (iii) exposure to particular classes of microbes indigent to the disposal environment. Elevated temperature and moisture may cause degradation but will not cause biodegradation of such articles unless the necessary microorganisms are also present. The combination of such conditions causes the articles formed from such a blend of materials to begin to biodegrade. Third party testing as described herein confirms that not only is the carbohydrate-based polymeric material biodegrading, but that the polyester plastic material which otherwise often exhibits very limited biodegradability is also biodegrading, as well.

While the mechanisms by which such biodegradation becomes possible upon blending with the carbohydrate-based polymeric material may not be completely understood, it is believed that blending the two plastic materials together, with a high degree of homogeneity, coupled with perhaps particular characteristics of the carbohydrate-based polymeric material somehow breaks the hygroscopic barrier associated with the polyester plastic materials, allowing the microbes that would biodegrade the carbohydrate-based polymeric material to not only biodegrade the carbohydrate-based polymeric material, but to also biodegrade the adjacent polyester linked plastic monomer units as well. The carbon and other bonds are being broken and the biodegradation is confirmed based on third party tests that capture and measure the carbon dioxide and methane that is off-gassed. Such results are surprising, unexpected, and particularly advantageous.

For example, previous literature within the field shows that some polyester plastic materials, such as polybutylene adipate-terephthalate ("PBAT") and polylactic acid ("PLA") are not particularly susceptible to biodegradation in a marine environment, even though they may exhibit some biodegradation in other disposal conditions, such as in industrial compost or the like. Such is likely due at least in part to the increased temperature associated with compost conditions as compared to marine disposal, as well as differences in the availability of oxygen between the different disposal conditions. For example "Environmental Degradation of Starch/Poly(Lactic Acid) Composite in Seawater" (Polymers and Polymer Composites, vol. 19, no. 7 (2011) describes how PLA biodegradation is very low (even negligible) in seawater. This was the case, even when the PLA was blended with conventional starch-based polymeric materials. Another paper, "PLA and PHA Biodegradation in the Marine Environment" (California Department of Resources Recycling and Recovery, 2012) corroborates the previously described findings, concluding that PLA alone exhibits no significant biodegradability when disposed of in marine conditions. Polyhydroxyalkanoate ("PHA") is another polyester plastic material. The same report shows about 40% degradation of PHA under similar conditions after 6 months, and somewhat more degradation after 12 months.

It would clearly be advantageous to find a way to increase the rate and/or extent of biodegradability of polyester plastic materials when disposed of in a marine environment, particularly for those materials like PLA, PBAT, PCL, PBS, and the like that show little if any tendency to biodegrade under such conditions, within a reasonable time frame. Such may also be desirable to increase degradation of other polyester materials, even if they may already exhibit significant degradation in marine conditions (e.g., such as with PHA). The present disclosure may allow further acceleration of such biodegradation with PHA and similar polyesters that do exhibit some tendency to biodegrade in marine conditions.

Plastic articles can be produced by mixing the carbohydrate-based polymeric material with the polyester plastic material, heating the mixture, and molding (e.g., injection molding) the mixture, extruding the mixture, blow molding the mixture, blow-forming the mixture (e.g., forming a blown film), thermoforming the mixture, or the like. Various other plastic manufacturing processes will be apparent to those of skill in the art in light of the present disclosure, and general knowledge of the art. Thermoset materials may similarly be blended (e.g., although heating may or may not be needed in such blending processes).

The articles described herein can be produced in the form of any conceivable structure, including, but not limited to bottles, boxes, other containers, sheets, films, bags, and the like. Thin films for bags and film wraps (e.g., for wrapping around or over a product) can easily be made using blown film equipment.

Examples of suitable carbohydrate-based or starch-based polymeric materials that have been shown to lend or increase biodegradability to polyester plastic materials exhibiting limited or no biodegradability are available from BiologiQ, under the tradename NuPlastiQ. Specific examples include, but are not limited to NuPlastiQ GP and NuPlastiQ CG. Specific characteristics of such NuPlastiQ materials will be described in further detail herein. Other carbohydrate-based or starch-based polymeric materials may also be suitable for use so long as they are capable of, and specifically selected for the purpose of increasing biodegradability of the plastic material with which is it blended (e.g., a polyester plastic material). In order to select such a material for this purpose, its ability to lend or increase biodegradability must have previously been recognized. Applicant is not currently aware of any such materials recognized to perform as such.

III. Exemplary Articles and Methods

FIG. 1 illustrates an exemplary process 100 that may be used to increase biodegradability of a polyester plastic material in a marine environment. At 102, the process 100 can include providing one or more polyester plastic (e.g., polymeric) materials (e.g., including, but not limited to PLA, PBAT, PCL, PBS, PHA, and the like). While PHA already exhibits significant marine biodegradability, the other listed materials generally do not, and blending with the carbohydrate-based polymeric materials as described herein lends biodegradability in marine conditions to such materials, and is also likely to significantly accelerate the rate and/or increase the full extent of such marine biodegradation of PHA. As such, use of PHA is within the scope of the present disclosure. At 104, the process 100 can include providing one or more carbohydrate-based polymeric materials, at least one of which is specifically selected for blending with the polyester for its recognized ability to increase biodegradability of the polyester plastic material provided at 102. The one or more carbohydrate-based polymeric materials can include starch-based polymeric materials, although typical conventionally available carbohydrate-based polymeric materials will not necessarily work. Applicant's NuPlastiQ material is an example of a particular carbohydrate-based polymeric material that will work as described herein. The selected carbohydrate-based polymeric material must be particularly configured to increase biodegradability of the material with which it is blended. The carbohydrate-based polymeric materials and the polyester plastic materials can be provided in a desired form, such as pellets, powders, nurdles, slurry, and/or liquids. In specific embodiments, the materials can be in the form of pellets. The method further includes blending the polyester plastic material with the carbohydrate-based polymeric material.

Such simple blending has surprisingly been observed by Applicant to render the polyester plastic material increasingly biodegradable in a marine environment, so long as the blending results in a homogenous mixture of the components, even where such polyester material did not previously exhibit any significant marine biodegradability. As a result, the blend of such materials is substantially fully marine biodegradable, and articles formed from such a blend are similarly marine biodegradable. By way of example, although PLA, PBAT, PCL, and the like may exhibit some tendency to biodegrade in a compost environment at a considerably elevated temperature (e.g., at 58° C.), where the availability of oxygen may be relatively plentiful, the literature evidences that these materials often do not exhibit any significant biodegradability in a marine environment, where the availability of oxygen is far lower, and the temperature is far lower (e.g., marine biodegradability is typically tested at 30° C.). While the biodegradability of such polyester materials varies material by material, many such materials simply exhibit little if any biodegradability in a marine environment.

Applicant has discovered that blending such polyester materials with the particular carbohydrate-based polymeric materials having characteristics as described herein dramatically increases marine biodegradability of the polyester material, so that not only does the carbohydrate-based polymeric material biodegrade in marine conditions, but that the polyester material blended therewith also biodegradables relatively rapidly when subjected to marine conditions, as a result of its blending with the carbohydrate-based polymeric material.

Such blends may be formed in manufacture into a desired article through any conceivable process. An example of such would be an extrusion process. For example, the polyester plastic material and the carbohydrate-based polymeric material selected for its ability to increase marine biodegradability can be fed into an extruder (e.g., into one or more hoppers thereof). The different materials can be fed into the extruder into the same chamber, into different chambers, at approximately the same time (e.g., through the same hopper), or at different times (e.g., through different hoppers, one being introduced into the extruder earlier on along the screw than the other), etc. It will be apparent that many numerous possibilities are possible.

In some cases, the polyester plastic material can be any plastic material in which the monomers or oligomers are linked to one another by ester linkages. For example, such plastic materials may include, but are not limited to PBAT, PLA, PBS, PCL, PHA, and the like. Such plastic materials may be sourced from petrochemical sources, or from so-called "green" or sustainable sources (e.g., corn used to produce lactic acid, used for form PLA, or the like).

The carbohydrate-based polymeric materials can be formed from a plurality of materials (e.g., a mixture) including one or more starches. For example, the one or more starches can be produced from one or more plants, such as corn starch, tapioca starch, cassava starch, wheat starch, potato starch, rice starch, sorghum starch, and the like. In some embodiments, a mixture of different types of starches may be used, which Applicant has found to result in a synergistic increase in strength, e.g., as described in Applicant's U.S. Pat. No. 10,214,634, herein incorporated by reference in its entirety. A plasticizer is also present within the mixture of components from which the carbohydrate-based polymeric material is formed. Water may also be used in forming the carbohydrate-based polymeric material (e.g., initially present as a plasticizer), although only a small to negligible amount of water is present in the finished carbohydrate-based polymeric material.

The one or more carbohydrate-based polymeric materials can be formed from mostly starch. For example, at least 65%, at least 70%, at least 75%, or at least 80% by weight of the carbohydrate-based polymeric material may be attributable to the one or more starches. In an embodiment, from 65% to 90% by weight of the finished carbohydrate-based polymeric material may be attributed to the one or more starches. Other than negligible water content, the balance of the finished carbohydrate-based polymeric material may be attributed to the plasticizer (e.g., glycerin). The finished carbohydrate-based polymeric material as exemplified in NuPlastiQ is not merely a mixture of starch and glycerin, as will be described hereafter in conjunction with FIG. 3. That said, the NuPlastiQ material is derived from a mixture of these materials.

The percentages above may represent starch percentage relative to the starting materials from which the carbohydrate-based polymeric material is formed, or that fraction of the finished carbohydrate-based polymeric material that is derived from or attributable to the starch(es) (e.g., at least 65% of the carbohydrate based polymeric material may be attributed to (formed from) the starch(es) as a starting material). Although some water may be used in forming the carbohydrate-based polymeric material, substantially the balance of the carbohydrate-based polymeric material may be attributed to glycerin, or another plasticizer. Very little residual water (e.g., less than 2%, typically no more than about 1% (e.g., 0.1 to 1.5%)) may be present in the finished carbohydrate-based polymeric material.

For example, the materials from which the one or more carbohydrate-based polymeric materials are formed can include at least 12%, at least 15%, at least 18%, at least 20%, at least 22%, no greater than 35%, no greater than 32%, no greater than 30%, no greater than 28%, or no greater than 25% by weight of a plasticizer. Such percentages may represent that fraction of the finished carbohydrate-based polymeric material that is derived from or attributable to the plasticizer (e.g., at least 12% of the carbohydrate based polymeric material may be attributed to (formed from) the plasticizer as a starting material). Such percentages may also represent that fraction of the mixture of materials from which the finished carbohydrate-based polymeric material is formed, excluding any initially present water. Of course, it may be possible that the carbohydrate-based polymeric material may be manufactured with less than 12% plasticizer (e.g., less than 12%, perhaps even 0%).

Exemplary plasticizers include, but are not limited to glycerin, polyethylene glycol, sorbitol, polyhydric alcohol plasticizers, hydrogen bond forming organic compounds which do not have a hydroxyl group, anhydrides of sugar alcohols, animal proteins, vegetable proteins, aliphatic acids, phthalate esters, dimethyl and diethylsuccinate and related esters, glycerol triacetate, glycerol mono and diacetates, glycerol mono, di, and tripropionates, butanoates, tearates, lactic acid esters, citric acid esters, adipic acid esters, stearic acid esters, oleic acid esters, other acid esters, or combinations thereof. Glycerin may be preferred.

The finished carbohydrate-based polymeric material may include no greater than 5%, no greater than 4%, no greater than 3%, no greater than 2%, no greater than 1.5%, no greater than 1.4%, no greater than 1.3%, no greater than 1.2%, no greater than 1.1%, or no greater than 1% by weight water. The NuPlastiQ materials available from BiologiQ are examples of such finished carbohydrate-based polymeric materials, although it will be appreciated that other materials available elsewhere (e.g., at some future time) may also be suitable for use.

In some embodiments, mixtures of different starches may be used in forming the carbohydrate-based polymeric material. Use of such a mixture of different starches (e.g., coming from different plants) has been found to surprisingly be associated with a synergistic increase in strength in articles including such carbohydrate-based polymeric materials. In such a mixture of starches, a starch can be present in the mixture in an amount of at least 1%, at least 2%, at least 3%, at least 4%, at least 5%, at least 10%, at least 15%, at least 20%, at least 25%, at least 30%, at least 35%, at least 40%, no greater than 95%, no greater than 90%, no greater than 85%, no greater than 80%, no greater than 75%, no greater than 70%, no greater than 65%, no greater than 60%, no greater than 55%, no greater than 50%, or from 10% to 50% by weight relative to the combined weight of the plurality of starches. Some non-limiting exemplary mixtures may include 90% of a first starch, and 10% of a second starch, or 30% of a first starch and 70% of a second starch, or 50% of a first starch and 50% of a second starch. Mixtures of more than two starches (e.g., using 3 or 4 different starches) can also be used.

Examples of suitable carbohydrate-based (e.g., starch-based) polymeric materials for use in forming films and other articles are available from BiologiQ, located in Idaho Falls, Id., under the tradename "NuPlastiQ," and formerly under the tradename "ESR" ("Eco Starch Resin"). Specific examples of NuPlastiQ include, but are not limited to NuPlastiQ GP and NuPlastiQ CG. Under the tradename ESR, such materials have previously been referred to as GS-270, GS-300, and GS-330, for example. Additional details relative to fractions of starch and glycerin or other plasticizers used in forming NuPlastiQ are described in Applicant's other patent applications, already incorporated herein by reference. NuPlastiQ may be provided in pellet form. Physical characteristics for GS-270 and GS-300 are shown in Table 1 below.

TABLE 1

| PROPERTY | TEST METHOD | GS-270 NOMINAL VALUE | GS-300 NOMINAL VALUE |
| --- | --- | --- | --- |
| Density | ASTM D-792 | 1.40 g/cm$^3$ | 1.42 g/cm$^3$ |
| THERMAL PROPERTIES | | | |
| Melt Flow Index 200° C./5 kg | ASTM D-1238 | 1.98 g/10 min | 1.95 g/10 min |
| Melting Temp. Range | ASTM D-3418 | 166-180° C. | 166-180° C. |
| Glass Transition Temp. | ASTM D-3418 | 81-100° C. | 81-100° C. |
| MECHANICAL PROPERTIES | | | |
| Tensile Strength @ Yield | ASTM D-638 | >30 MPa | >14 MPa |
| Tensile Strength @ Break | ASTM D-638 | >30 MPa | >14 MPa |
| Young's Modulus | ASTM D-638 | 1.5 GPa | 1.5 GPa |
| Elongation at Break | ASTM D-638 | <10% | <10% |
| Impact Resistance (Dart) | ASTM D-5628 | 3.5 kg | 4.5 kg |
| ADDITIONAL PROPERTIES | | | |
| Water Content | ASTM D-6980 | ≤1.5%, or ≤1% | ≤1.5%, or ≤1% |

The above characteristics shown for GS-270 and GS-300 are exemplary of other NuPlastiQ products available from BiologiQ, although values may vary somewhat. For example, NuPlastiQ products from BiologiQ may generally have a glass transition temperature ranging from about 70° C. to about 100° C. Those of skill in the art will appreciate that glass transition temperature can be indicative of degree of crystallinity. Values for melting temperature range, density, Young's Modulus, and water content may be identical or similar to those shown above in Table 1. Some characteristics may similarly vary somewhat (e.g., ±25%, or ±10%) from values shown for GS-270 and GS-300, e.g., for NuPlastiQ GP and NuPlastiQ CG, or may be substantially identical to the values shown in Table 1. NuPlastiQ has an amorphous structure (e.g., more amorphous than typical raw starch). For example, typical raw starch powder has a mostly crystalline structure (e.g., greater than 50%), while NuPlastiQ has a mostly amorphous structure (e.g., less than 10% crystalline).

NuPlastiQ has a low water content, as described. As NuPlastiQ absorbs moisture, it exhibits plastic behavior and becomes flexible. When removed from a humid environment, the material dries out and becomes stiff again (e.g., again exhibiting less than about 1% water content). The moisture present in NuPlastiQ (e.g., in pellet form) may be released in the form of steam during processing such as that shown in FIGS. 1-2. As a result, films or other articles produced from a starch-based polymeric material such as NuPlastiQ blended with a polyester plastic material may exhibit even lower water content, as the polyester plastic material typically will include no or negligible water, and the water in the NuPlastiQ may typically be released during manufacture of a desired article.

Low water content in the carbohydrate-based polymeric material can be important, as significant water content can result in incompatibility with the polyester plastic material, particularly if the article requires formation of a thin film. For example, as the water vaporizes, this can result in voids within the film or other article, as well as other problems. When blowing a thin film, the carbohydrate-based polymeric material used may preferably include no more than about 1% water.

Low water content is not believed to be achieved in the NuPlastiQ material through esterification, as is common in some conventional TPS materials that may include relatively low water content. Such esterification can be expensive and complex to perform. The same may be said of etherification. Furthermore, the NuPlastiQ materials that are exemplary of the carbohydrate-based polymeric materials employable herein also typically do not themselves actually include any identifiable starch, or identifiable glycerin, as such, as the starting materials of the NuPlastiQ or other carbohydrate-based polymeric material have been chemically reacted and/or altered. X-ray diffraction patterns of exemplary carbohydrate-based polymeric materials as described below (e.g., and shown in FIG. 3) evidence such chemical alteration, showing that the finished polymeric material may be substantially devoid of starch in such identifiable, native form. In other words, the carbohydrate-based polymeric material is not simply a mixture including starch and glycerin. The low water content achievable in the carbohydrate-based polymeric material is believed to be due at least in part to the chemical alteration of the starch and plasticizer materials into a thermoplastic polymer, which does not retain water as would native starch, or conventional thermoplastic starches (e.g., native starch includes about 13% retained water).

In testing the marine biodegradability of NuPlastiQ material itself under ASTM D6691, NuPlastiQ GP was found to pass the standard, where a "pass" is achieved if degree of biodegradation is greater than 70% at the end of the test. After 28 days, the NuPlastiQ GP had a biodegradation of 92.4%. The positive control was cellulose, which exhibited biodegradation of 84.4% over the same 28 day period (i.e., the NuPlastiQ was more biodegradable than the cellulose positive control).

Returning to FIG. 1, processing at relatively high temperatures may result in some release of volatilized glycerin (e.g., visible as smoke). If needed (e.g., where stored pellets may have absorbed additional water), drying of pellets can be performed by simply introducing warm dry air, e.g., at 60° C. for 1-4 hours, which is sufficient to drive off any absorbed water. Pellets should be dried to less than about 1% moisture content prior to processing, particularly if forming a film. NuPlastiQ pellets may simply be stored in a sealed container with a desiccant in a dry location, away from heat to minimize water absorption, and to prevent undesired degradation.

In addition to NuPlastiQ being thermoplastic, the NuPlastiQ may also be thixotropic, meaning that the material is solid at ambient temperature, but flows as a liquid when heat, pressure and/or frictional movement are applied. Advantageously, pellets of NuPlastiQ can be used the same as petrochemical based pellets (any typical thermoplastic resin pellets) in standard plastic production processes. NuPlastiQ materials and products made therefrom may exhibit gas barrier characteristics. Products (e.g., films) made using such NuPlastiQ pellets exhibit oxygen gas barrier characteristics (e.g., see Examples of Applicant's previous filings, already incorporated by reference). NuPlastiQ materials may be non-toxic and edible, made using raw materials that are all edible. NuPlastiQ and products made therefrom may be water resistant, but water soluble. For example, NuPlastiQ may resist swelling under moist heated conditions to the point that pellets (e.g. with a size of 3-4 mm) thereof may not completely dissolve in boiling water within 5 minutes, but a pellet will dissolve in the mouth (e.g., at 37° C.) within about 10 minutes. NuPlastiQ may be stable, in that it may not exhibit any significant retrogradation, even if left in relatively high humidity conditions, which characteristic differs from many other thermoplastic starch materials. Of course, products made with NuPlastiQ may also exhibit such characteristics. If NuPlastiQ is stored in humid conditions, the excess absorbed water can simply be evaporated away, and once the water content is no more than about 1%, it can be used in forming a film or other article.

The NuPlastiQ material also does not typically undergo disintegration or biodegradation under typical storage conditions, even in relatively humid conditions, as the other conditions typical of a marine environment, landfill, compost or similar disposal environment are not present. Of course, where such conditions are present, not only does the NuPlastiQ biodegrade, but polyester plastic materials that exhibit limited or no biodegradability in a marine environment now exhibit accelerated marine biodegradability. In addition to marine biodegradability, accelerated biodegradability under other disposal conditions (e.g., compost, landfill, or the like) is also typically exhibited. Evidence of such surprising acceleration of marine biodegradability is included in the Examples section of the present application.

NuPlastiQ can be cost competitive, being manufactured at a cost that is competitive with traditional polyethylene or other plastic resins. NuPlastiQ can be mixed with other polymers, such as the various polyesters noted herein, e.g., polylactic acid (PLA), polybutylene adipate-terephthalate (PBAT), polybutylene succinate (PBS), polycaprolactone (PCL), polyethylene terephthalate (PET), polyhydroxyalkanoate (PHA), and the like. It can also be blended with a wide variety of other polymers, such as polyethylene, polypropylene, polystyrene, acrylonitrile butadiene styrene (ABS), polyvinyl chloride, nylon, and others. Blends of such materials with a polyester, in combination with NuPlastiQ are of course possible.

Figure 7:
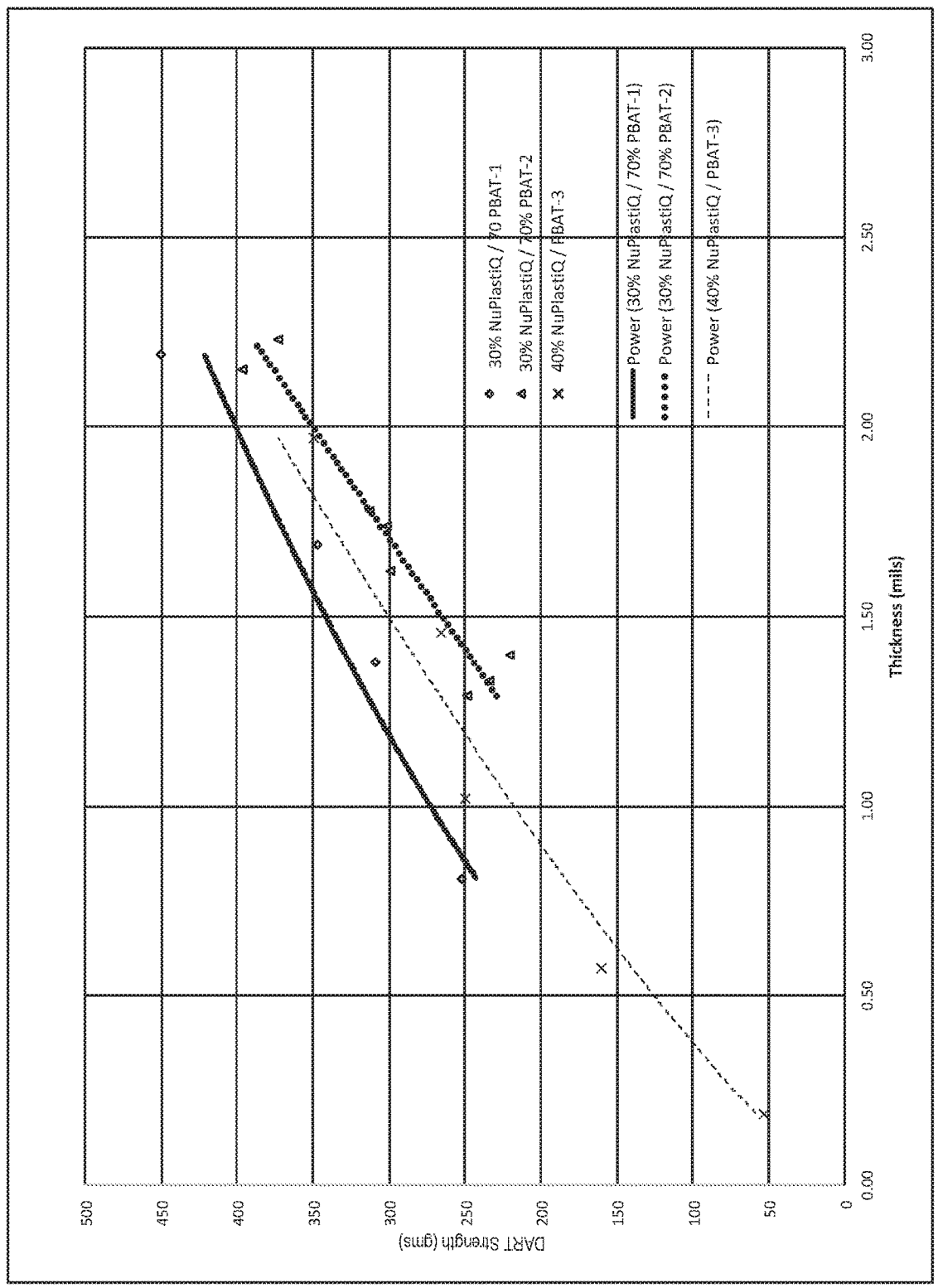
FIG. 7 shows strength values for various tested blends of PBAT and NuPlastiQ, showing the strength of tested films at varying thicknesses.

PBAT and other polyesters are typically more expensive than more common polymer resins, such as polyethylene. For example, PBAT may typically be about 3× as expensive as polyethylene. Because NuPlastiQ is competitive in cost with polyethylene, the present blends can actually be provided less expensively than a conventional 100% PBAT film or other article. For example, such blends may be produced at approximately 20-30% less expense than a conventional 100% PBAT film. Such blended films are useful in various environments, e.g., including but not limited to as an agricultural mulch (e.g., weed barrier). As shown in FIG. 7, the strength characteristics of such blends provide sufficient dart drop strength for various uses, including agricultural mulch or weed barrier layer, as well as numerous other uses, at an improved cost. In addition, such blends also offer the advantage of a significant fraction of the blended article being sourced from a sustainable source material (e.g., starch).

While various polyesters (e.g., PLA) may be compostable, meaning that it can degrade under elevated temperature conditions (i.e., industrial composting conditions, such as at 58° C.), many such materials are technically not "biodegradable", in that they will not biodegrade to any significant extent at lower temperatures (e.g., 30° C.), particularly in marine conditions (e.g., where oxygen availability is more scarce). The degree to which a given polyester plastic material will biodegrade or is compostable varies from one material to another. For example, PHA may be one of the more easily biodegraded polyester polymeric materials, so as to even exhibit significant biodegradation on its own in marine conditions. PLA, PCL, PBAT and various other polyesters though exhibit limited if any such biodegradability under marine conditions. By homogenously blending the carbohydrate-based polymeric materials having particular characteristics (e.g., as exemplified in NuPlastiQ) therewith, the extent and/or rate of biodegradability (particularly marine biodegradability) is significantly increased for those materials with which it is blended. Current FTC Green guidelines stipulate that a plastic cannot make an unqualified claim that it is "degradable" unless it will degrade within a "reasonably short period of time" (most recently defined as within 5 years) "after customary disposal". The present blends greatly accelerate biodegradation of particularly polyester polymeric materials under marine conditions. Because marine biodegradability is typically more difficult to achieve than land-based biodegradability (e.g., as exemplified in landfill disposal, or compost disposal), where something is shown to biodegrade in marine conditions (e.g., as exemplified by ASTM D-6691), it will also exhibit biodegradability under such land-based disposal conditions, typically at an even more accelerated rate and/or total extent. The rate and/or extend of land-based biodegradation of the present blends may similarly be accelerated or increased as compared to the polyester alone, or to conventional blends of such a polyester with native starch or a conventional starch-based polymeric material.

In some embodiments, the NuPlastiQ could be provided in a masterbatch formulation that may include the carbohydrate-based polymeric material as described above, and an amount of one or more compatibilizers. The masterbatch may also include one or more polyester or other plastic materials. Such masterbatch formulation pellets could be mixed with pellets of the polyester plastic material at the time of processing. Any conceivable ratios may be used in mixing such different pellets, depending on the desired percentage of NuPlastiQ and/or compatibilizer and/or conventional polyster plastic material in the finished article.

The NuPlastiQ materials described as suitable for use herein as the carbohydrate-based (e.g., starch-based) polymeric material are substantially amorphous. For example, raw starch powder (e.g., such as is used in making NuPlastiQ and various other thermoplastic starch materials) has approximately a 50% crystalline structure. NuPlastiQ materials available from BiologiQ differ from many other commercially available thermoplastic starch (TPS) materials in crystallinity versus amorphous characteristics. For example, p. 62-63 of "Thermoplastic Starch Composites and Blends" a PhD thesis by Kris Frost (September 2010) states "[o]f particular interest in TPS is completeness of gelatinisation during processing, and any subsequent tendency toward retrogradation to form V-type amylose crystals". Frost further continues "[g]elatinisation involves loss of granular and crystalline structures by heating with water and often including other plasticizers or modifying polymers. Retrogradation is due to the re-coiling of amylose helical coils. Starch molecules disrupted during gelatinisation slowly re-coil into their native helical arrangements or new single helical conformations known as V type, causing TPS films to rapidly become brittle and lose optical clarity". Thus, conventional TPS tends to re-form a crystalline structure after the gelatinization process used to produce the TPS from raw starch. On the contrary, the NuPlastiQ material available from BiologiQ does not revert back to a mostly crystalline structure. In addition, it can maintain a stable, relatively high degree of optical clarity, so as to be useful in forming relatively optically clear films.

Figure 3:
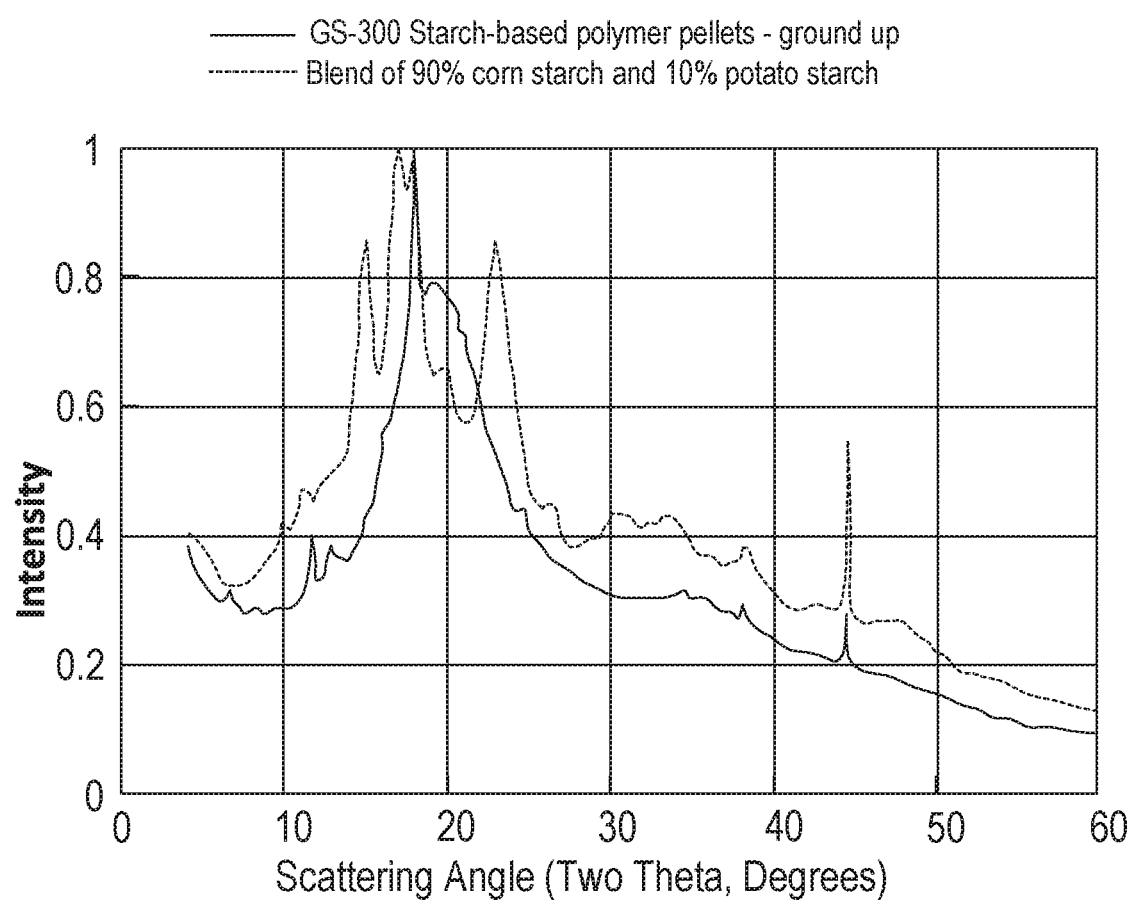
FIG. 3 shows X-ray diffraction patterns for an exemplary "NuPlastiQ" carbohydrate-based polymeric material commercially available from BiologiQ as compared to that of the blend of native corn starch and native potato starch used to form the NuPlastiQ.

In contrast to typical TPS materials, the NuPlastiQ materials that are suitable examples of starch-based polymeric materials for use in forming articles described in the present application have an amorphous microstructure, and physical characteristics as shown in Table 1. The difference in the molecular structure between conventional TPS and NuPlastiQ materials is evidenced by the NuPlastiQ materials as described herein being much less crystalline than conventional thermoplastic starch-based materials as shown by X-ray diffraction, shown in FIG. 3, comparing diffraction pattern results for NuPlastiQ material available from BiologiQ (sample 1) as compared to a blend of native raw corn starch and native raw potato starch, from which the NuPlastiQ in FIG. 3 was formed. The diffraction pattern of the NuPlastiQ as seen in FIG. 3 is much less crystalline (e.g., crystallinity of less than about 10%) than that of the native starch blend (crystallinity of about 50%). The difference in diffraction pattern evidences that a substantial chemical change has occurred in the material, due to processing the native starches into NuPlastiQ. For example, while there is a prominent diffraction peak between 20-25° with the native starch, no such peak is exhibited in the NuPlastiQ. The native starch further shows a strong peak at about 45° (at an intensity of 0.5 to 0.6), which peak is greatly reduced in the NuPlastiQ (only of about 0.25 to 0.3). Across nearly the entire spectrum, the diffraction intensities are higher for the native starches than for the NuPlastiQ, with the exception of from about 18° to about 22°, as shown. The elevated diffraction intensity seen across a wide spectrum is indicative of greater crystallinity of the native starches as compared to the NuPlastiQ. Numerous other differences also exist, as shown.

By way of example, the carbohydrate-based (e.g., starch-based) polymeric material used in making films according to the present disclosure may have a crystallinity of less than about 60%, less than about 50%, less than about 40%, less than about 35%, less than about 30%, less than about 25%, less than about 20%, less than about 15%, less than about 10%, less than about 8%, less than about 6%, less than about 5%, or less than about 3%. Any suitable test mechanism for determining crystallinity may be used, e.g., including but not limited to FTIR analysis, X-ray diffraction methods, and symmetrical reflection and transmission techniques. Various suitable test methods will be apparent to those of skill in the art.

In addition to the differences in the chemical or microstructure of the finished NuPlastiQ as compared to the starting materials, films, bottles, sheets, disposable utensils, plates, cups, or other articles produced from a blend including the carbohydrate-based polymeric material are different from articles that are otherwise similar, but formed using conventional TPS or starch powder, or the polyester plastic materials alone. For example, articles formed by blending the carbohydrate-based polymeric materials such as NuPlastiQ as described herein with a polyester plastic material do not have "sea-island" features that are common when blending conventional TPS materials with polymeric materials. Rather, a substantially homogenous blend is achievable. The homogeneous blend characteristics may play a part in the observed accelerated marine biodegradability, as well as enhanced biodegradability under land-based disposal environments (e.g., simulated landfill or simulated compost).

As described herein, blending of the carbohydrate-based polymeric materials as described herein with a polyester plastic material results in not just the carbohydrate-based material being biodegradable, but the polyester plastic material itself actually exhibits improved marine biodegradability. As noted, enhanced land-based biodegradability may also be provided. Such results (particularly enhanced marine biodegradability) do not occur when blending with typical TPS materials, as exemplified in the testing described in "Environmental Degradation of Starch/Poly(Lactic Acid) Composite in Seawater", referenced above. In that reference, it was found that even when PLA was blended with a conventional thermoplastic starch, the PLA component of the blend continued to exhibit no significant ability to undergo biodegradation in a marine disposal environment. Substantially all observed biodegradation was attributable to the starch component of the blend. The test results commissioned by Applicant here show significantly accelerated marine biodegradation for polyester polymeric materials, such as PBAT, PLA, and the like. Such differences in biodegradability clearly illustrate that there are significant structural and/or chemical differences in the NuPlastiQ material as compared to conventional TPS materials, and in blends that include NuPlastiQ, as the entire composite structure of the blend (i.e., the film or other structure) is now capable of being substantially fully biodegraded in marine conditions, as shown by the various examples below.

Without being bound to any particular theory, it is believed that the carbohydrate-based polymeric resins may reduce the crystallinity of the blended products, interrupting the crystallinity and/or hygoscopic barrier characteristics of the polyester plastic material in a way that allows water and bacteria to degrade the arrangements and linkages of otherwise stable plastic molecules of the blend along with the carbohydrate-based polymeric resin material. In other words, the ester linked monomers are more easily broken away and eventually digested by microbes that exist in marine environments, when homogeneously blended with the particular carbohydrate-based polymeric materials as contemplated herein. The microorganisms that exist naturally in a marine disposal environment (e.g., in the ocean) can consume such small molecules so that they are converted back into natural components (such as $CO_2$, $CH_4$, and $H_2O$).

For example, truly biodegradable plastics decompose into natural elements or compounds such as carbon dioxide, methane, water, inorganic compounds, or biomass via microbial assimilation (e.g., the enzymatic action of microorganisms on the plastic molecules). Biodegradation of plastics can be enabled by first breaking down the polymer chains via either chemical or mechanical action but may only be fully accomplished through decomposition of the remaining molecules by microbial assimilation.

Plastics made from petrochemical feedstocks or derived from plant sources begin life as monomers (e.g., single small molecules that can react chemically with other small molecules). When monomers are joined together, they become polymers ("many parts"), known as plastics. Before being joined together, many monomers are readily biodegradable, although after being linked together through polymerization, the molecules become so large and joined in such arrangements and linkages that microbial assimilation by microorganisms is not practical within any reasonable time frame under the contemplated conditions.

Polymers are formed with both crystalline (regularly packed) structures and amorphous (randomly arranged) structures. Many polymers contain a high degree of crystallinity with some amorphous regions randomly arranged and entangled throughout the polymeric structure.

NuPlastiQ materials available from BiologiQ are formed from starting starch materials which are highly crystalline, but in which the finished NuPlastiQ plastic resin material exhibits low crystallinity (i.e., they are substantially amorphous). Such starch-based polymer materials are used as a starting material in the production of articles as described herein. NuPlastiQ is, therefore, plastic that is made from starch. Because of its natural, starch-based origin and carefully controlled linkage types, the molecules (size and links) of plastic made with NuPlastiQ are highly susceptible to biodegradation by enzymatic reactions caused from the introduction of water and bacteria or other microorganisms, as evidenced by the experimental test results included herein.

Like polyolefins such as polyethylene and polypropylene, polyesters typically have a high degree of crystallinity and are made by converting monomer molecules (whether petroleum derived or derived from lactic acid or other small building block molecules derived from plant sources) into long chain polymers. In polyesters, the linkages between monomers are of course ester linkages. The linkages created when connecting the monomers to form long polymer chains are relatively strong and difficult to break. While some synthetic polyesters exhibit some degree of biodegradability under some conditions (e.g., elevated temperature compost conditions), such materials generally exhibit relatively little if any biodegradability under temperature and other conditions typically associated with a marine environment (e.g., 30° C., with limited oxygen availability, as exemplified by ASTM D-6691). Blending such materials with Applicant's NuPlastiQ material changes that.

In addition to enhanced marine biodegradability, in some embodiments, the resulting blend may have a higher elastic modulus (stiffness, or strength) than the polyester plastic material alone, and can be used to make plastic films or other articles that are at least as strong or stronger than the same articles made with the pure polyester plastic material. In other embodiments, depending on the characteristics of the polyester material being blended with, strength characteristics may be decreased, but still sufficient for the desired purpose (e.g., as an agricultural mulch weed barrier, or otherwise). Details of increased strength in many blends are described in various of Applicant's other U.S. patent applications, already incorporated by reference herein. Exemplary strength values for films formed from blends of NuPlastiQ and PBAT are shown in FIG. 7. By way of example, such a blend may provide a dart drop strength of at least 175 g, at least 200 g, or at least 210 g, at a thickness of 1 mil. With increased thickness, there is generally an increase in strength. The fraction of carbohydrate-based polymeric material in the blend may be as described herein or as described in others of Applicant's applications, e.g., from 1% to 50%, from 1% to 40%, from 5% to 40%, from 10% to 35%, etc.

Returning to FIG. 1, at 106, the process 100 includes mixing the polyester plastic material and the carbohydrate-based polymeric material to produce a mixture of materials. In some cases, the mixing of the polyester plastic material and the carbohydrate-based material can be performed using one or more mixing devices. In a particular implementation, a mechanical mixing device can be used to mix the polyester plastic material and the carbohydrate-based polymeric material. In an implementation, at least a portion of the components of the mixture of the materials can be combined in an apparatus, such as an extruder, an injection molding machine, or the like. In other implementations, at least a portion of the components of the mixture of the materials can be combined before being fed into the apparatus.

The carbohydrate-based polymeric material can be present in the mixture in an amount sufficient to lend or increase biodegradability of the particular polyester plastic material that the carbohydrate-based polymeric material is blended with. Such threshold level of the carbohydrate-based polymeric material may depend on the material it is being blended with. By way of example, the carbohydrate-based polymeric material may be included in an amount of at least 0.5%, at least 1%, at least 2%, at least 3%, at least 4%, at least 5%, at least 10%, at least 15%, at least 20%, at least 25%, at least 30%, at least 35%, at least 40%, at least 45%, no greater than 99%, no greater than 95%, no greater than 90%, no greater than 80%, no greater than 70%, no greater than 60%, no greater than 50%, from 2% to 98%, from 10% to 40%, from 20% to 40%, from 20% to 30%, from 50% to 80%, or from 40% to 60% by weight of the mixture of materials. More than one carbohydrate-based polymeric material, and/or more than one polyester plastic material may be included in the blend, if desired.

The polyester plastic material can be present in the mixture of materials in an amount of at least 0.5%, at least 1%, at least 2%, at least 3%, at least 4%, at least 5%, at least 10%, at least 15%, at least 20%, at least 25%, at least 30%, at least 35%, at least 40%, at least 45%, at least 50%, no greater than 99%, no greater than 95%, no greater than 90%, no greater than 85%, no greater than 80%, no greater than 75%, no greater than 70%, no greater than 65%, or no greater than 60%, from 2% to 98%, from 50% to 90%, from 65% to 75%, from 20% to 50%, or from 40% to 60% by weight of the mixture of materials.

A compatibilizer may be present in the mixture of materials. The compatibilizer can be mixed with the polyester plastic material, the carbohydrate-based polymeric material, mixed with both, or provided separately. Often the compatibilizer may be provided with at least one of the polymeric materials, e.g., included in a masterbatch formulation. The compatibilizer can be a modified plastic, such as a maleic anhydride grafted polypropylene, a maleic anhydride grafted polyethylene, a maleic anhydride grafted polybutene, or a combination thereof. The compatibilizer can also include an acrylate based co-polymer. For example, the compatibilizer can include an ethylene methyl acrylate co-polymer, an ethylene butyl-acrylate co-polymer, or an ethylene ethyl acrylate co-polymer. Additionally, the compatibilizer can include a poly(vinylacetate) based compatibilizer. In an embodiment, the compatibilizer may be a grafted version of the polyester plastic material (e.g., maleic anhydride grafted polyester) or a copolymer (e.g., a block copolymer) where one of the blocks is of the same monomer as the polyester plastic material (e.g., a polyester copolymer).

The mixture of materials may include at least 0.5%, at least 1%, at least 2%, at least 3%, at least 4%, at least 5%, no greater than 50%, no greater than 45%, no greater than 40%, no greater than 35%, no greater than 30%, no greater than 25%, no greater than 20%, no greater than 15%, no greater than 10%, no greater than 9%, no greater than 8%, no greater than 7%, no greater than 6%, from 0.5% by weight to 12%, from 2% to 7%, or from 4% to 6% by weight of a compatibilizer. Due to cost, generally the lowest effective amount of compatibilizer may be used.

Although certainly not required, and in at least some embodiments the inclusion of such would be best avoided, it is within the scope of the present invention to include any of a variety of UV and/or OXO degradable additives. Additional details of such additives are found in Applicant's U.S. patent application Ser. No. 16/391,909 (21132.14.1), herein incorporated by reference in its entirety. Other additives, for example, for increased strength (e.g., Biomax® Strong from Dupont), or otherwise may be included.

One or more additives can be included in the mixture of materials in an amount of at least 0.5%, at least 1%, at least 1.5%, at least 2%, at least 2.5%, at least 3%, at least 4%, of no greater than 10%, no greater than 9%, no greater than 8%, no greater than 7%, no greater than 6%, no greater than 5%, from 0.2% to 12%, from 1% to 10%, from 0.5% to 4%, or from 2% by weight to 6% by weight of the mixture.

While principally described in the context of a mixture of thermoplastic materials that can be melted together, to form a desired blend, in some embodiments, it may be possible to blend the carbohydrate-based polymeric material with a plastic material that is not thermoplastic (e.g., a thermoset polyester or other thermoset plastic material). For example, the resin components that are precursors of such a non-thermoplastic polyester plastic material may be blended with the carbohydrate-based polymeric material, where polymerization or other formation of the polyester material may occur in the presence of the carbohydrate-based polymeric material, resulting in a finished article that is a blend of the carbohydrate-based polymeric material and a thermoset or other non-thermoplastic plastic material, where the carbohydrate-based polymeric material may lend or increase marine or other biodegradability of the non-thermoplastic plastic material upon blending of the two together.

Referring again to FIG. 1, at 108, particularly where the materials are thermoplastic, the process 100 may include heating the mixture of materials. In an implementation, the mixture of materials can be heated to a temperature of at least 100° C., at least 110° C., at least 115° C., at least 120° C., at least 125° C., at least 130° C., at least 135° C., at least 140° C., no greater than 200° C., no greater than 190° C., no greater than 180° C., no greater than 175° C., no greater than 170° C., no greater than 165° C., no greater than 160° C., no greater than 155° C., no greater than 150° C., from 95° C. to 205° C., from 120° C. to 180° C., or from 125° C. to 165° C. Of course, it will be appreciated that in some embodiments, the mixture may be heated to temperatures greater than 200° C., while still maintaining the biodegradable characteristics described herein.

The mixture of materials including the polyester plastic material and the carbohydrate-based polymeric material can be heated in one or more chambers of an extruder. In some cases, one or more chambers of the extruder can be heated at different temperatures. The speed of one or more screws of the extruder can be set to any desired rate.

It is of course also possible to heat one material first, then add a second material at a subsequent (e.g., downstream) input, and it will be heated after the first material, so that they can be melt-blended together. FIG. 1 is meant to encompass all such conditions.

At 110, an article is produced using the mixture of materials. In some cases, the article can include a film. In other cases, the article can be formed from a film. In other embodiments, the article can have a shape based on a design, such as a mold (e.g., injection molded). Any conceivable article formed of plastic may be formed from the mixture, e.g., including but not limited to films, bags, bottles, caps, lids, sheets, boxes, plates, cups, utensils, and the like. Where the article is a film, the film can be formed using a die by injecting a gas into the heated mixture of material to form the film (i.e., blowing the film). Films can be sealed and/or otherwise modified to be in the form of a bag or other article.

Where the article is a film, the film can be comprised of a single layer or multiple layers. The film or any individual layers can have a thickness of at least 0.001 mm, at least 0.002 mm, at least 0.004 mm, at least 0.01 mm, at least 0.02 mm, at least 0.03 mm, at least 0.05 mm, at least 0.07 mm, at least 0.10 mm, no greater than 2 mm, no greater than 1 mm, no greater than 0.5 mm, no greater than 0.1 mm, from about 0.05 mm to about 0.5 mm, or from 0.02 mm to 0.05 mm. While there may be some overlap in thickness values for film and sheet articles, it will be appreciated that sheet materials of greater thickness than such film values may of course be provided (e.g., 2 mm or more, such as 2-100 mm or 2 to 10 mm), produced by any desired plastic manufacturing process.

Films or other articles can have strength characteristics that are characterized through testing, such as a dart drop impact test (ASTM D-1709), tensile strength at break test (ASTM D-882), tensile elongation at break test (ASTM D-882), a secant modulus test (ASTM D-882), and/or an Elmendorf Tear test (ASTM D-1922). Exemplary values for such characteristics are provided in various of Applicant's other applications, already incorporated by reference herein.

In some cases, articles including a carbohydrate-based polymeric material formed from a mixture of two or more starches have values of strength properties that are greater than articles including a carbohydrate-based polymeric material formed from a single starch. For example, an article including a carbohydrate-based polymeric material formed from a mixture of two or more starches can have a dart drop impact test value (in grams or g/mil of thickness) that is at least about 10% greater, at least about 25% greater, at least about 50% greater, at least about 75% greater, from 10% greater to 150% greater, or from 60% greater to 120% greater than an article where the carbohydrate-based polymeric material is formed from a single starch. Details of such increased strength is found within Applicant's U.S. Pat. No. 10,214,634 and U.S. patent application Ser. No. 15/481, 806, already incorporated by reference.

When subjected to biodegradation testing (e.g., under an applicable ASTM standard such as D-6691), the present blends exhibit significant marine biodegradation within a given time period (e.g., 180 days, 200 days, 365 days, 400 days, 1 year, 2 years, 3 years, 4 years, or 5 years). For example, the article may show substantial biodegradation of the total polymeric content, and/or of the polyester plastic content (apart from the carbohydrate-based polymeric content) within such time frame. Data in the Examples section describes substantially complete biodegradation of such blends in a marine environment after about 400 days, as well as enhanced biodegradation of the blends in land-based disposal environments.

While biodegradation in a marine environment is particularly contemplated and described in detail, it will be appreciated that enhanced biodegradation may also be exhibited under more favorable disposal environments, e.g., such as composting, or landfills. That said, as described herein, the ability to show biodegradation under marine conditions is quite a stringent standard because of at least the associated oxygen and temperature characteristics of such testing environment. In other words, if biodegradability can be shown under such marine conditions, the material is likely to also exhibit biodegradability (even enhanced biodegradability in rate or extent) under the more favorable conditions of composting or other land-based disposal ASTM simulated conditions (e.g., as exemplified by any of ASTM D-5511, ASTM D-5526, or ASTM D-5338).

When subjected to biodegradation testing, an article having no greater than about 2% by weight of a biodegradation enhancing additive (or preferably being free thereof) and having an amount of carbohydrate-based polymeric material and polyester plastic material as described herein can exhibit enhanced marine biodegradation, as a result of the introduction of the carbohydrate-based polymeric material into the article. For example, at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or even at least 95% of the polyester polymeric material (e.g., or carbon atoms thereof) may biodegrade over a period of about 180 days, about 200 days, about 400 days, about 1 year, about 2 years, or other given test period when subjected to marine conditions. In any case, the degree of degradation of the polyester material of the blend, as well as the blend itself, will be greater than the degree of degradation exhibited by the material without addition of the NuPlastiQ or other carbohydrate-based polymeric material. Such enhanced marine and/or other biodegradation is particularly remarkable and advantageous in light of the testing described in the literature to date.

The Examples show that with increased time, the amount of biodegradation in marine conditions can be very high, such that in at least some implementations, substantially the entire article biodegrades (e.g., biodegradation of at least about 80%, at least about 85%, at least about 90%, or at least about 95%) within 400 days, within 1 year, within 2 years, or the like.

Figure 2:
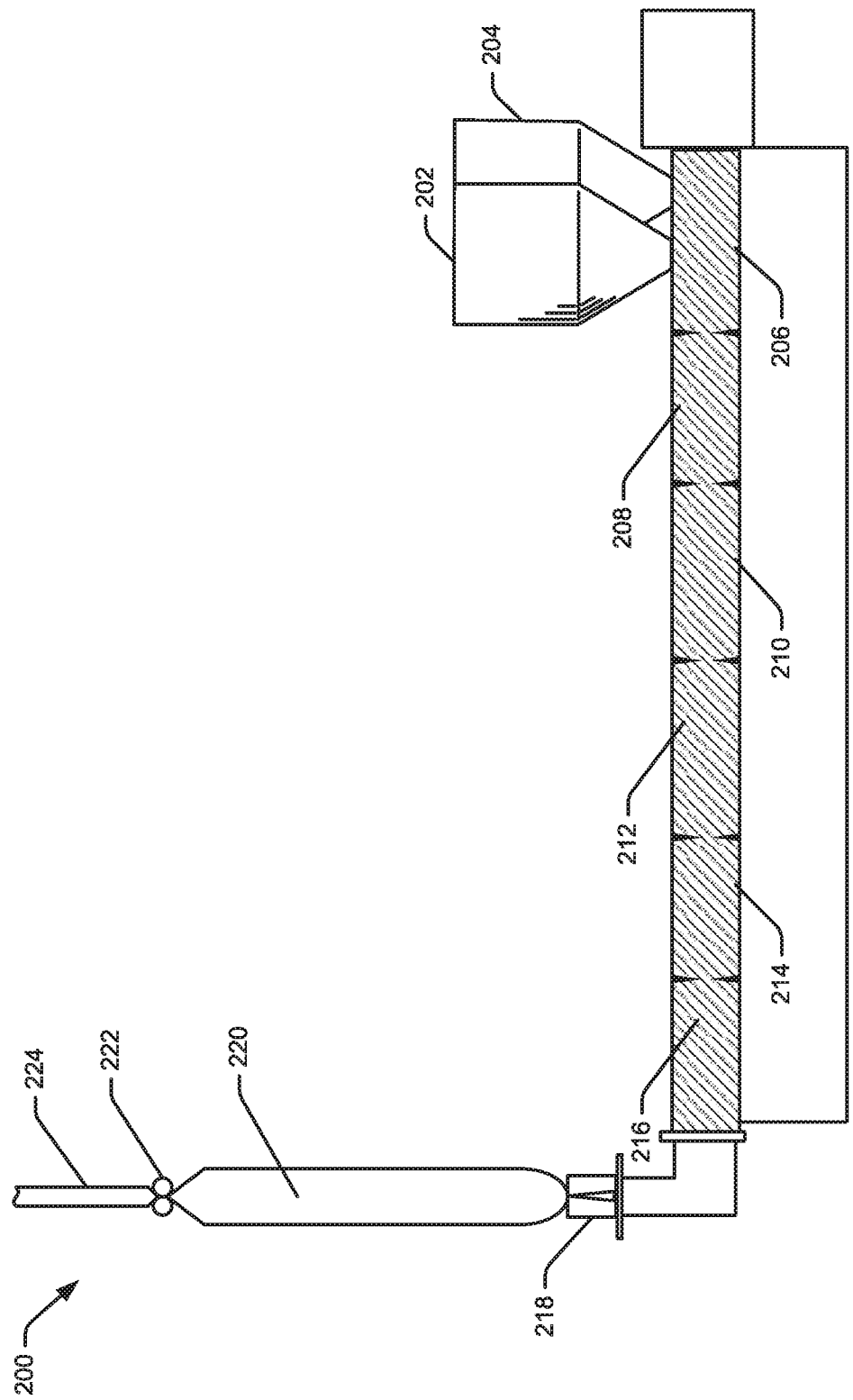
FIG. 2 illustrates components of an example manufacturing system to produce articles according to FIG. 1.

FIG. 2 illustrates components of an example manufacturing system 200 to produce articles according to the present disclosure. In some cases, the manufacturing system 200 can be used in the process 100 of FIG. 1. In an illustrative example, the manufacturing system 200 is an extruder, such as a single screw extruder or a twin screw extruder.

In an implementation, one or more polyester plastic materials and one or more carbohydrate-based polymeric materials are provided via a first hopper 202 and a second hopper 204. A compatibilizer may be included with either or both materials (e.g., in a masterbatch thereof). A calcium carbonate or other filler material such as talc may be added separately or included in a masterbatch. In a typical implementation, compounding of the carbohydrate-based polymeric material into a masterbatch (e.g., with any compatibilizer) may have been performed previous to placing pellets of such masterbatch into hopper 204. Such a masterbatch may of course also include some portion of the polyester plastic material therein, as well.

The one or more carbohydrate-based polymeric materials and the one or more polyester plastic materials can be mixed in a first chamber 206 to produce a mixture of materials. In some cases, the mixture of materials can include from 5% by weight to 40% by weight of the one or more carbohydrate-based polymeric materials, from 60% by weight to 94% by weight of the one or more polyester plastic materials, and from 0% by weight to 9% by weight of the one or more compatibilizers. Where a mineral or other filler material is included (e.g., calcium carbonate and/or talc), such may be present from 0% to 30%, or up to 20% by weight. The ranges of course may be varied outside the above ranges, depending on desired characteristics.

One exemplary composition may include from 5% to 70% of the carbohydrate-based polymeric material(s), from 10% to 80% of a polyester plastic material such as PBAT, from 0% to 60% PLA, and from 0% to 30% calcium carbonate or other filler. Such a composition may include a combination of PBAT and PLA. A compatibilizer may or may not be present.

In the example implementation shown in FIG. 2, the mixture of materials can pass through a number of chambers, such as the first chamber 206, a second chamber 208, a third chamber 210, a fourth chamber 212, a fifth chamber 214, and an optional sixth chamber 216. The mixture of materials can be heated in the chambers 206, 208, 210, 212, 214, 216. In some cases, a temperature of one of the chambers can be different from a temperature of another one of the chambers. In an illustrative example, the first chamber 206 is heated to a temperature from 120° C. to 140° C.; the second chamber 208 is heated to a temperature from 130° C. to 160° C.; the third chamber 210 is heated to a temperature from 135° C. to 165° C.; the fourth chamber 212 is heated to a temperature from 140° C. to 170° C.; the fifth chamber 214 is heated to a temperature from 145° C. to 180° C.; and the optional sixth chamber 216 is heated to a temperature from 145° C. to 180° C.

The heated mixture can then be extruded using a die 218 to form an extruded object, such as a film, sheet, or the like. Injection molding, thermoforming, or other plastic production processes may be used to manufacture various articles such as agricultural mulch (weed barrier), utensils, plates, cups bottles, caps or lids therefore, or the like. In film blowing, a gas can be injected into the extruded object to expand it with a pressure from 105 bar to 140 bar. The resulting tube 220 can be drawn up through rollers 222 to create a film 224 with a thickness typically from 0.02 mm (about 0.8 mil) to 0.05 mm (about 2 mil). Even thinner films can be made using the blends as described herein, e.g., having a thickness as little as 0.1 mil (0.004 mm). Of course, thicknesses greater than 2 mil can also be achieved. In some cases, the film 224 can be comprised of a single layer. In other cases, the film 224 can be comprised of multiple layers. Where multiple layers are present, at least one of the layers may include the carbohydrate-based polymeric material. In some embodiments, the carbohydrate-based polymeric material may be present in one or more outer layers. In another embodiment, the carbohydrate-based polymeric material may be present in an inner layer. Where no carbohydrate-based polymeric material is included in the outer layer(s), biodegradation of the outer layer(s) may not be accelerated, or accelerated to less degree.

The concepts described herein will be further described in the following examples. Some examples below show substantially complete biodegradation of the polyester portion of the composite blends, and/or substantially complete biodegradation of the composite as a whole (e.g., both the polyester component and the carbohydrate-based polymeric material). By "substantially complete", it is meant that there is at least 80%, at least 85%, at least 90%, or at least 95% biodegradation of the referenced material. Substantially complete may also refer to the situation (as in Example 1) where the biodegradation after a given time period is equal to or exceeds the biodegradation of the cellulose positive control used in such tests.

In any case, after a given period (e.g., 180 days, 200 days, 300 days, 400 days, etc.), the biodegradation of the polyester component and/or the composite as a whole may be at least 30%, at least 40%, at least 50%, at least 60%, at least 70%, at least 80%, or at least 90%. This may be determined according to a mass balance on the carbon, whereby carbon atoms beginning in the material of the blend (e.g., in the carbohydrate-based polymeric material and/or in the polyester) are accounted for in off-gassed products, as $CH_4$ or $CO_2$, as a result of biodegradation. For example, at least 30% (or 40%, or 50%, or 60%, or 70%, or 80%, or 90%, etc.) of carbon atoms of the polyester may become at least one of $CO_2$, or $CH_4$ at about 180 days (or 200 days, or 300 days, or 400 days, etc.) in such simulated marine conditions (or simulated landfill or simulated compost conditions). In one particular embodiment, there may be at least 30% biodegradation of the article as a whole or the polyester component of the blend after 180 days. To pass ASTM D7081 requires (1) conversion of at least 30% of the carbon in the sample to $CO_2$, or $CH_4$ at 180 days and (2) the samples must pass the ASTM D6400 standard for biodegradability in an industrial compost environment. The samples shown in the examples below meet such requirements.

EXAMPLES

Example 1

Figure 4:
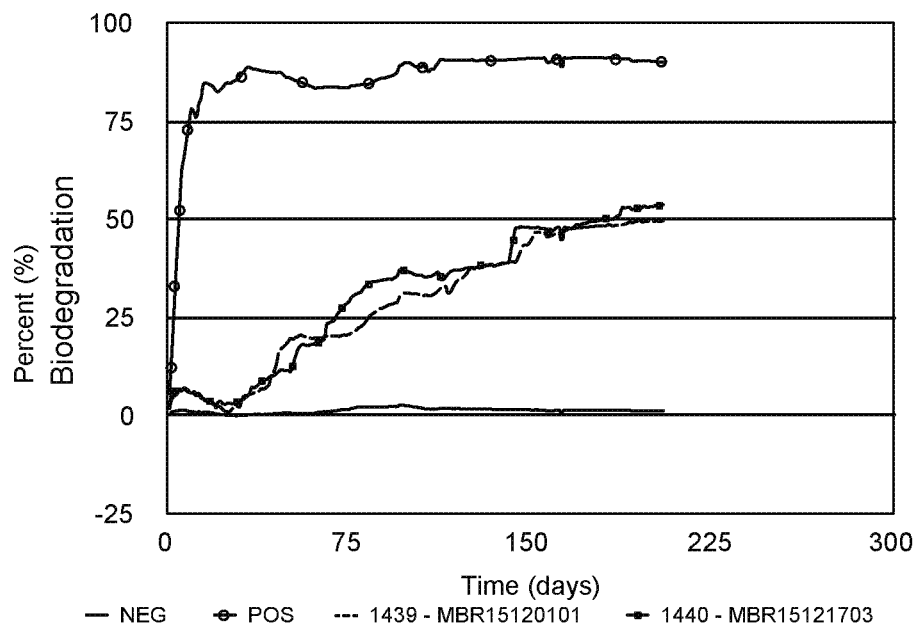
FIG. 4 shows percent biodegradation measured over 205 days according to ASTM D-6691, meant to simulate marine conditions, for various samples made according to the present disclosure, as well as comparative controls.

Films made with a blend of NuPlastiQ and PBAT were tested for anaerobic biodegradation after 205 days according to ASTM D-6691, which is meant to simulate marine conditions. The tested films are labeled 1439 and 1440 in Table 2 and FIG. 4. At 205 days, samples 1439 and 1440 respectively showed adjusted percent biodegraded values of 49.6% and 53.6%. Sample 1439 included 30% ESR, 67% PBAT, and 3% compatibilizer. Sample 1440 included 27% ESR, 70% PBAT, and 2.5% compatibilizer. Sample film 1439 had a thickness of 1.1 mil, and sample film 1440 had a thickness of 1.0 mil.

TABLE 2

| | Inoculum | Negative | Positive | 1439 | 1440 |
|---|---|---|---|---|---|
| Cumulative Gas Volume (mL) | 22.0 | 25.4 | 86.7 | 61.6 | 65.2 |
| Percent $CO_2$ (%) | 91.8 | 85.4 | 88.7 | 91.7 | 91.3 |
| Volume $CO_2$ (mL) | 20.2 | 21.7 | 76.9 | 56.4 | 59.5 |
| Mass $CO_2$ (g) | 0.040 | 0.043 | 0.151 | 0.111 | 0.117 |
| Sample Mass (g) | | 0.080 | 0.080 | 0.080 | 0.080 |
| Theoretical Sample Mass (g) | | 0.069 | 0.034 | 0.039 | 0.039 |
| Biodegraded Mass (g) | 0.011 | 0.012 | 0.041 | 0.030 | 0.032 |
| Percent Biodegraded (%) | | 1.2 | 90.0 | 49.6 | 53.6 |

The films showed a significant degree of biodegradation of the polyester component of the blend over 205 days, as the percentage of biodegradation at day 205 is greater (by about 20 percentage points) than the percentage of NuPlastiQ included in the film. In other words, the polyester linkages of the polymer chains are being broken up and digested by microorganisms present in such conditions (e.g., by the same or alternate microorganisms that consume the starch-based polymeric NuPlastiQ material), with the digested materials being converted through microbial action (i.e., biodegradation) into $CO_2$ and/or $CH_4$.

This significant degradation of the polyester component in the blend under marine conditions, at 30° C.±2° C., with limited oxygen as dictated by ASTM D-6691 is in sharp contrast and particularly excellent as compared to the results reported in the literature, where polyesters such as PBAT, PLA, and PCL exhibit little if any tendency to biodegrade in marine conditions, even if mixed with conventional starch.

Example 2

Figure 5:
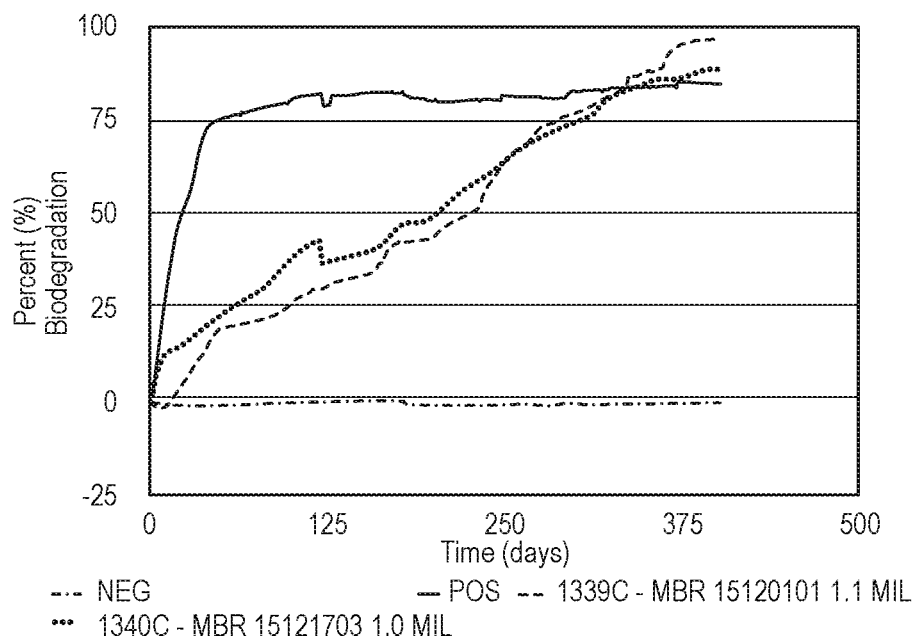
FIG. 5 shows percent biodegradation measured over 403 days according to ASTM D-6691, simulating marine conditions, for two samples including a blend of a polyester (PBAT) and NuPlastiQ, showing the biodegradability of the blend material under simulated marine conditions.

Films made with a blend of NuPlastiQ and PBAT were tested for marine biodegradation over a period of 403 days according to ASTM D-6691. The tested films are labeled 1339C and 1340C in Table 3 and FIG. 5. Sample 1339C included 30% NuPlastiQ, 67% PBAT, and 3% compatibilizer. Sample 1340C included 27% NuPlastiQ, 70% PBAT, and 2.5% compatibilizer. Sample film 1339C had a thickness of 1.1 mil, and sample film 1340C had a thickness of 1.0 mil. The positive control was cellulose and the negative control was polyethylene.

TABLE 3

| | Inoculum | Negative | Positive | 1339C | 1340C |
|---|---|---|---|---|---|
| Cumulative Gas Volume (mL) | 15.66 | 14.48 | 96.77 | 168.32 | 148.09 |
| Percent $CO_2$ (%) | 81.23 | 82.60 | 82.18 | 88.15 | 85.26 |
| Volume $CO_2$ (mL) | 12.72 | 11.96 | 79.53 | 148.37 | 126.27 |
| Mass $CO_2$ (g) | 0.025 | 0.023 | 0.156 | 0.291 | 0.248 |
| Sample Mass (g) | 1000.0 | 0.1 | 0.1 | 0.1 | 0.1 |
| Theoretical Sample Mass (g) | 0.00 | 0.09 | 0.04 | 0.07 | 0.07 |
| Biodegraded Mass (g) | 0.007 | 0.006 | 0.043 | 0.079 | 0.068 |
| Percent Biodegraded (%) | | −0.48 | 84.81 | 96.93 | 88.70 |

The films showed substantially complete biodegradation under marine conditions after 403 days, with the percentage biodegradation exceeding that of the cellulose positive control after about 300 days. In other words, both the NuPlastiQ and the PBAT are substantially fully biodegraded after about 400 days, and the degree of biodegradation after about 300 days is equal to that exhibited by the cellulose positive control. This significant degradation of the polyester component in the blend under marine conditions, at 30° C.±2° C., with limited oxygen as dictated by ASTM D-6691 is in sharp contrast and particularly excellent as compared to the results reported in the literature, where polyesters such as PBAT, PLA, and PCL exhibit little if any tendency to biodegrade in marine conditions, even if mixed with conventional starch.

Example 3

Figure 6:
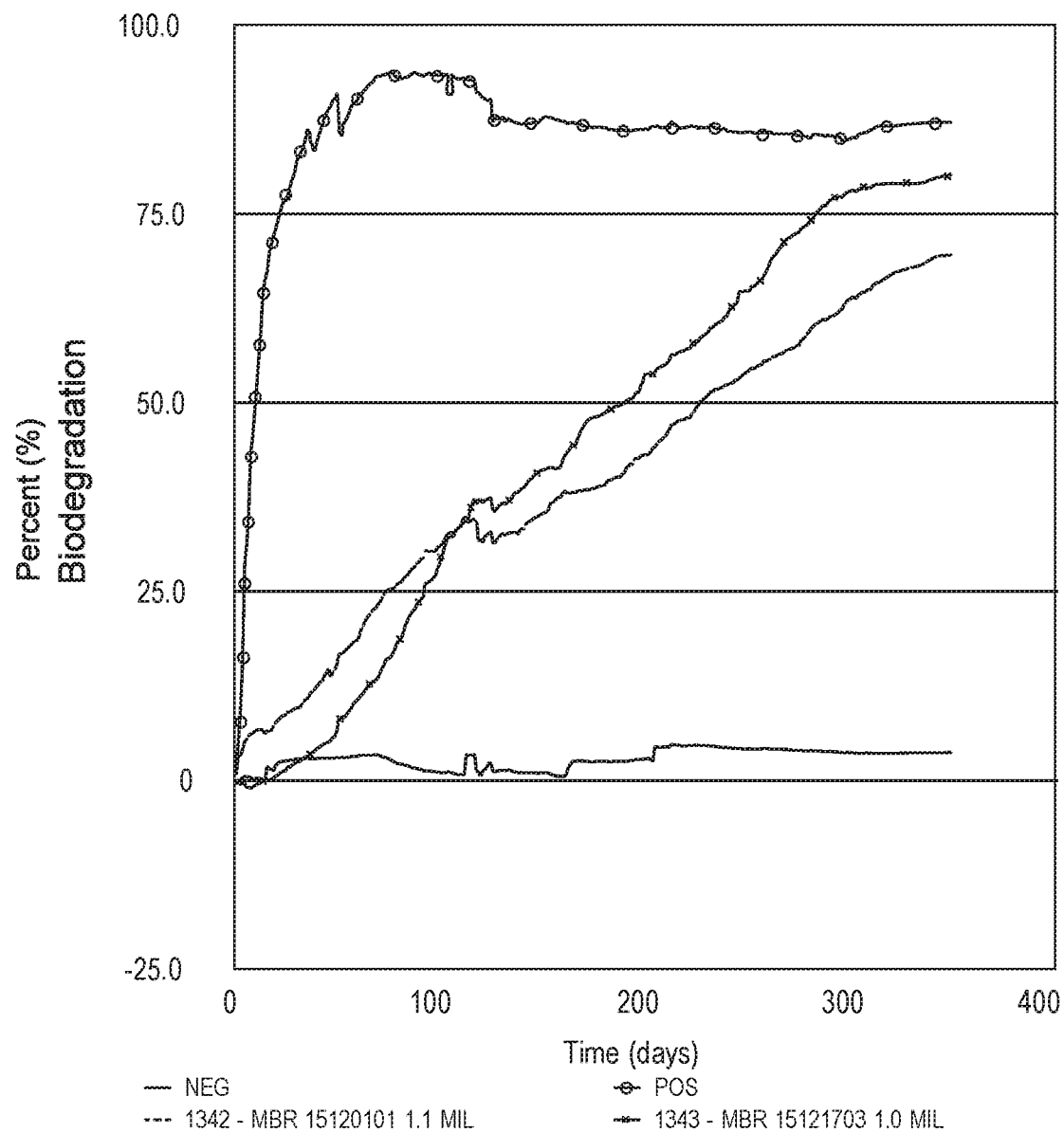
FIG. 6 shows percent biodegradation measured over 349 days according to testing conducted under ASTM D-5511 for two samples including a blend of a polyester (PBAT) and NuPlastiQ, showing the biodegradability of the material under simulated landfill conditions.

This example is included as a further point of reference, for comparison with Examples 1-2 showing marine biodegradability. Two samples of blends of NuPlastiQ and PBAT were tested according to ASTM D-5511, which simulates conditions of a landfill (i.e., anaerobic digester), over a period of 349 days. While not marine conditions, such testing serves as a comparison standard, showing the biodegradability of such blends under other conditions (where ASTM D-5511 conditions would generally be recognized to be more favorable to biodegradation than conditions under ASTM D-6691). The results of the two samples (referred to as 1342, 1343) are shown in FIG. 6 and in Table 4. Sample 1342 was a film formed from 30% NuPlastiQ, 67% PBAT, and 3% compatibilizer, and had a thickness of 1.1 mil. Sample 1343 was a film formed from 27.5% NuPlastiQ, 70% PBAT and 2.5% compatibilizer, and had a thickness of 1.0 mil.

TABLE 4

| | Inoculum | Negative | Positive | 1342 | 1343 |
|---|---|---|---|---|---|
| Cumulative Gas Volume (mL) | 4064.3 | 4898.8 | 12330.2 | 18429.0 | 20233.7 |
| Percent $CH_4$ (%) | 43.2 | 43.6 | 41.4 | 48.8 | 53.7 |
| Volume $CH_4$ (mL) | 1757.0 | 2135.1 | 5101.0 | 8992.6 | 10865.0 |
| Mass $CH_4$ (g) | 1.26 | 1.53 | 3.64 | 6.42 | 7.76 |
| Percent $CO_2$ (%) | 40.4 | 37.8 | 41.9 | 35.5 | 35.7 |
| Volume $CO_2$ (mL) | 1643.0 | 1852.9 | 5160.5 | 6547.5 | 7230.7 |

TABLE 4-continued

|  | Inoculum | Negative | Positive | 1342 | 1343 |
|---|---|---|---|---|---|
| Mass $CO_2$ (g) | 3.23 | 3.64 | 10.14 | 12.86 | 14.20 |
| Sample Mass (g) | 10 | 10 | 10 | 20.0 | 20.0 |
| Theoretical Sample Mass (g) | 0.0 | 8.6 | 4.2 | 9.8 | 9.8 |
| Biodegraded Mass (g) | 1.82 | 2.14 | 5.50 | 8.33 | 9.69 |
| Percent Biodegraded (%) |  | 3.7 | 87.1 | 66.4 | 80.2 |

FIG. 6 shows that after 204 days, the negative control showed 2.5% degradation, the positive control showed 86.5% degradation, sample 1342 showed 43.3% degradation, sample 1343 showed 53.9% degradation, and sample 1344 showed 77.2% degradation. At 349 days, the degradation values are as shown in Table 4 (i.e., 87.1% for the positive control (cellulose), 66.1% for sample 1342, and 80.2% for sample 1343).

Such degradation under land-based disposal conditions is also enhanced (e.g., faster rate and/or greater extent of biodegradation) as compared to what occurs with a 100% PBAT film, or with a film that is a conventional blend of PBAT and conventional starch or conventional TPS material.

IV. Conclusion

In closing, although the various implementations have been described most particularly in the context of increasing marine biodegradability of polyester plastic components, marine biodegradability may also be possible with additional plastic structures, e.g., even with polyolefins such as polyethylene, e.g., by blending Applicant's NuPlastiQ material with such other plastics. Applicant has demonstrated biodegradability for blends of NuPlastiQ with polyethylene in land-based disposal environments in other of Applicant's applications, already incorporated by reference. As such, further testing may possibly show the ability to lend biodegradability in marine environments for such non-polyester blends as well. Other plastic materials which may possibly exhibit increased marine biodegradability upon blending with carbohydrate-based polymeric materials as described herein may include, but are not limited to, polyethylene, polypropylene, polystyrene, acrylonitrile butadiene styrene ("ABS"), polycarbonate, and the like. For example, Applicant has anecdotal evidence, of at least some biodegradability occurring in a marine environment for a film formed from about 20% NuPlastiQ and about 80% polyethylene.

In addition, while described most particularly in the context of increasing marine biodegradability for the polyester blends, it will be appreciated that the scope of the present disclose and invention also extends to providing enhanced biodegradability for such blends in land-based disposal environments, e.g., where such a blended composite plastic material exhibits biodegradation that occurs faster or to a further extent than is provided in conventional blends of such polyesters with conventional starch or TPS materials.

It is to be understood that the embodiments of the inventive features disclosed herein are illustrative of the principles of the inventive features. Other modifications that may be employed are within the scope of the inventive features. Thus, by way of example, but not of limitation, alternative configurations of the inventive features may be utilized in accordance with the teachings herein, e.g., at least as described in the above paragraph.

The invention claimed is:

1. A method for increasing biodegradability of a polyester containing plastic material that exhibits limited or no biodegradability on its own in a marine environment, the method comprising:
   providing a polyester containing plastic material that has limited if any biodegradability characteristics in a marine environment;
   providing a starch-based polymeric material formed from a chemical reaction and/or alteration of starch and a plasticizer, the starch-based polymeric material being selected for its ability to increase biodegradability of the polyester containing plastic material in a marine environment wherein said starch-based polymeric material: (1) is substantially devoid of starch in native form; (2) has a crystallinity of less than about 20% and resists recrystallization; (3) has a water content of no more than about 2% by weight and (4) when blended in a mixture with the polyester containing plastic material, the blend exhibits a lack of sea-island features within said blend; and
   blending the starch-based polymeric material with the polyester containing plastic material to form a composite polyester containing plastic material;
   wherein the polyester portion of the composite exhibits increased biodegradability in a marine environment after blending.

2. The method of claim 1, wherein the polyester containing plastic material comprises polybutyrate adipate terephthalate ("PBAT").

3. The method of claim 1, wherein the polyester containing plastic material comprises at least one of polybutyrate adipate terephthalate ("PBAT"), polylactic acid ("PLA"), polybutylene succinate ("PBS"), polycaprolactone ("PCL"), polyhydroxyalkanoate ("PHA") or polyethylene terephthalate ("PET").

4. The method of claim 1, wherein the polyester containing plastic material comprises a bioPBS.

5. The method of claim 1, wherein at least 30% of the polyester portion of the composite biodegrades in a marine environment within about 400 days.

6. The method of claim 1, wherein at least 40% of the polyester portion of the composite biodegrades in a marine environment within about 400 days.

7. The method of claim 1, wherein at least 50% of the polyester portion of the composite biodegrades in a marine environment within about 400 days.

8. The method of claim 1, wherein at least 75% of the polyester portion of the composite biodegrades in a marine environment within about 400 days.

9. The method of claim 1, wherein at least 90% of the polyester portion of the composite biodegrades in a marine environment within about 400 days.

10. The method of claim 1, wherein substantially all of the polyester portion of the composite biodegrades in a marine environment within about 400 days.

11. The method of claim 1, wherein biodegradation of the composite in a marine environment within about 400 days is at least 90% or greater than biodegradation of a cellulose positive control at same test conditions.

12. A composite comprising:
a polyester containing plastic material that has limited if any biodegradability characteristics in a marine environment on its own; and
a starch-based polymeric material formed from a chemical reaction and/or alteration of starch and a plasticizer that increases biodegradability of the polyester containing plastic material in a marine environment, wherein said starch-based polymeric material: (1) is substantially devoid of starch in native form; (2) has a crystallinity of less than about 20% and resists recrystallization; (3) has a water content of no more than about 2% by weight and (4) when blended in a mixture with the polyester containing plastic material, the blend exhibits a lack of sea-island features within said blend, wherein the starch-based polymeric material is blended with the polyester containing plastic material to form the composite, wherein the polyester portion of the composite exhibits increased biodegradability in a marine environment as compared to the polyester containing plastic material on its own.

13. The composite of claim 12, wherein the polyester containing plastic material comprises polybutyrate adipate terephthalate ("PBAT").

14. The composite of claim 12, wherein the polyester containing plastic material comprises at least one of polybutyrate adipate terephthalate ("PBAT") polylactic acid ("PLA"), polybutylene succinate ("PBS"), polycaprolactone ("PCL"), polyhydroxyalkanoate ("PHA"), or polyethylene terephthalate ("PET").

15. The composite of claim 12, wherein the polyester containing plastic material comprises a bioPBS.

16. The composite of claim 12, wherein at least 30% of the polyester portion of the composite biodegrades in a marine environment within about 400 days.

17. The composite of claim 12, wherein substantially all of the polyester portion of the composite biodegrades in a marine environment within about 400 days.

18. The composite of claim 12, wherein biodegradation of the composite in a marine environment within about 400 days is equal to or greater than biodegradation of a cellulose positive control at same test conditions.

19. A composite comprising:
a polyester containing plastic material that has limited if any biodegradability characteristics in a simulated or actual marine or land-based disposal environment on its own; and
a starch-based polymeric material formed from a chemical reaction and/or alteration of starch and a plasticizer that increases biodegradability of the polyester containing plastic material in the simulated or actual marine or land-based disposal environment, wherein said starch-based polymeric material: (1) is substantially devoid of starch in native form; (2) has a crystallinity of less than about 20% and resists recrystallization; (3) has a water content of no more than about 2% by weight and (4) when blended in a mixture with the polyester containing plastic material that is not biodegradable on its own, the blend exhibits a lack of sea-island features within said blend, wherein the starch-based polymeric material is blended with the polyester containing plastic material to form the composite, wherein the polyester portion of the composite exhibits increased rate or extent of biodegradability in the simulated or actual marine or land-based disposal environment as compared to the polyester containing plastic material on its own.

20. An agricultural mulch or a weed barrier comprising a film formed from the composite of claim 19.

* * * * *